(12) United States Patent
Berliner et al.

(10) Patent No.: US 12,028,804 B2
(45) Date of Patent: Jul. 2, 2024

(54) NETWORK-SUPPORTED POWER MANAGEMENT FOR BASE STATIONS

(71) Applicant: QUALCOMM Incorporated, San Diego, CA (US)

(72) Inventors: Ran Berliner, Kfar-Aviv (IL); Guy Wolf, Rosh Haayin (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 17/195,457

(22) Filed: Mar. 8, 2021

(65) Prior Publication Data

US 2022/0286957 A1   Sep. 8, 2022

(51) Int. Cl.
*H04W 40/34* (2009.01)
*H04B 7/0413* (2017.01)
(Continued)

(52) U.S. Cl.
CPC ....... *H04W 52/0206* (2013.01); *H04W 36/32* (2013.01); *H04W 64/006* (2013.01); *H04W 92/20* (2013.01)

(58) Field of Classification Search
CPC ............. H04W 52/0206; H04W 36/32; H04W 64/006; H04W 92/20; H04W 24/02; H04W 28/0226; H04W 28/0861; H04W 36/324; H04W 40/34; H04W 40/36; H04W 76/27; H04W 92/14; H04B 7/0413; H04B 7/0617
See application file for complete search history.

(56) References Cited

U.S. PATENT DOCUMENTS 7,751,778 B1 *   7/2010   Ngan .................... H04W 24/02
                                             455/414.1
9,461,917 B1 *  10/2016   Liu ....................... H04W 36/22
(Continued)

FOREIGN PATENT DOCUMENTS

EP        2280573 A2       2/2011
KR    20150126047 A  *   11/2015
(Continued)

OTHER PUBLICATIONS

International Search Report and Written Opinion—PCT/US2022/015292—ISA/EPO—Jun. 28, 2022.
(Continued)

*Primary Examiner* — Kashif Siddiqui
(74) *Attorney, Agent, or Firm* — Holland & Hart LLP/Qualcomm

(57) ABSTRACT

Methods, systems, and devices for wireless communications are described. An access device in a network of access devices may determine that a wireless device is in a coverage area of one of the access devices based on a coverage pattern of the access devices and a sensor coupled with the access device. The access device may estimate a trajectory of the wireless device based on information obtained by the sensor. After estimating the trajectory of the wireless device, the access device may transmit an indication to one or more of the other access devices to enter (or remain in) an active state based on the trajectory of the wireless device and the coverage pattern. The indication may also include a set of beams for the other access device to activate.

30 Claims, 9 Drawing Sheets

(51) Int. Cl.
*H04B 7/06* (2006.01)
*H04W 24/02* (2009.01)
*H04W 28/02* (2009.01)
*H04W 28/086* (2023.01)
*H04W 36/32* (2009.01)
*H04W 40/36* (2009.01)
*H04W 52/02* (2009.01)
*H04W 64/00* (2009.01)
*H04W 76/27* (2018.01)
*H04W 92/14* (2009.01)
*H04W 92/20* (2009.01)

(56) References Cited

U.S. PATENT DOCUMENTS

| | | | | |
|---|---|---|---|---|
| 2001/0022558 | A1* | 9/2001 | Karr, Jr. | G01S 5/0278 |
| | | | | 342/450 |
| 2010/0062774 | A1* | 3/2010 | Motegi | H04W 36/02 |
| | | | | 455/437 |
| 2012/0004009 | A1* | 1/2012 | Lindoff | H04W 52/0206 |
| | | | | 455/522 |
| 2013/0083714 | A1 | 4/2013 | Joko et al. | |
| 2013/0288658 | A1* | 10/2013 | Duan | H04W 52/0206 |
| | | | | 455/418 |
| 2014/0010133 | A1* | 1/2014 | Roebke | H04W 52/028 |
| | | | | 370/311 |
| 2014/0120893 | A1* | 5/2014 | Malladi | H04W 52/0206 |
| | | | | 455/418 |
| 2017/0055273 | A1* | 2/2017 | Sharma | H04W 72/542 |
| 2018/0269954 | A1* | 9/2018 | Raghavan | H04B 7/0628 |
| 2018/0295546 | A1* | 10/2018 | Crawford | H04L 67/148 |
| 2018/0302853 | A1* | 10/2018 | Chandra | H04W 52/0206 |
| 2019/0150047 | A1* | 5/2019 | Comstock | H04W 36/0083 |
| | | | | 370/331 |
| 2019/0253469 | A1 | 8/2019 | Rubin et al. | |
| 2019/0260455 | A1 | 8/2019 | Ryu et al. | |
| 2019/0261193 | A1 | 8/2019 | Torsner et al. | |
| 2020/0229081 | A1* | 7/2020 | Ang | H04W 16/08 |
| 2020/0351739 | A1* | 11/2020 | Vaidya | H04W 36/36 |
| 2021/0037458 | A1* | 2/2021 | Shojaeifard | H04W 36/32 |
| 2021/0051759 | A1* | 2/2021 | Zhou | H04W 76/28 |
| 2021/0058146 | A1* | 2/2021 | Eichen | H04W 16/14 |
| 2021/0234591 | A1* | 7/2021 | Eleftheriadis | H04B 7/0626 |
| 2021/0284098 | A1* | 9/2021 | Scott | G01S 13/08 |
| 2022/0124570 | A1* | 4/2022 | Skarin | H04W 36/32 |

FOREIGN PATENT DOCUMENTS

| | | | | |
|---|---|---|---|---|
| KR | WO-2016024795 A2 * | 2/2016 | | |
| WO | WO-2010050885 A1 | 5/2010 | | |
| WO | WO-2013084790 A1 * | 6/2013 | | H04W 36/22 |
| WO | WO-2014126356 A1 * | 8/2014 | | H04W 16/32 |
| WO | WO-2015170144 A1 | 11/2015 | | |
| WO | WO-2016024795 A2 * | 2/2016 | | G08B 21/24 |
| WO | WO-2022199824 A1 * | 9/2022 | | |

OTHER PUBLICATIONS

Partial International Search Report—PCT/US2022/015292—ISA/EPO—May 6, 2022.

* cited by examiner

NETWORK-SUPPORTED POWER MANAGEMENT FOR BASE STATIONS

FIELD OF TECHNOLOGY

The following relates to wireless communications, including network-supported power management for base stations.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support network-supported power management for base stations. An access device, such as a base station, in a network of access devices may determine that a wireless device, such as a user equipment, is in a coverage area of one of the access devices based on a coverage pattern of the access devices and at least one sensor coupled with the access device. The access device may estimate, for example, a trajectory of the wireless device based on information obtained by the sensor. After estimating the trajectory of the wireless device, the access device may transmit an indication to one or more of the other access devices to enter (or remain in) an active state based on the trajectory of the wireless device and the coverage pattern, among other factors or conditions. The indication may also include a set of beams for the other access device to activate or implement.

A method for wireless communication is described. The method may include determining, at a first base station of a set of multiple base stations, that a user equipment (UE) is located in a coverage area of one of the set of multiple base stations within a coverage pattern for the set of multiple base stations based on data from one or more sensors coupled with the first base station, a radio resource control state of the UE, or both, where the coverage pattern for the set of multiple base stations is based on an arrangement of a set of multiple coverage areas of the set of multiple base stations, estimating, at the first base station, a trajectory of the UE based on the one or more sensors, and transmitting, from the first base station to a second base station of the set of multiple base stations via a backhaul interface, an indication to enter a first operating state and of one or more beams to enable after entering the first operating state based on the trajectory of the UE and the coverage pattern.

An apparatus for wireless communication is described. The apparatus may include a processor, memory coupled with the processor, and instructions stored in the memory. The instructions may be executable by the processor to cause the apparatus to determine, at a first base station of a set of multiple base stations, that a UE is located in a coverage area of one of the set of multiple base stations within a coverage pattern for the set of multiple base stations based on data from one or more sensors coupled with the first base station, a radio resource control state of the UE, or both, where the coverage pattern for the set of multiple base stations is based on an arrangement of a set of multiple coverage areas of the set of multiple base stations, estimate, at the first base station, a trajectory of the UE based on the one or more sensors, and transmit, from the first base station to a second base station of the set of multiple base stations via a backhaul interface, an indication to enter a first operating state and of one or more beams to enable after entering the first operating state based on the trajectory of the UE and the coverage pattern.

Another apparatus for wireless communication is described. The apparatus may include means for determining, at a first base station of a set of multiple base stations, that a UE is located in a coverage area of one of the set of multiple base stations within a coverage pattern for the set of multiple base stations based on data from one or more sensors coupled with the first base station, a radio resource control state of the UE, or both, where the coverage pattern for the set of multiple base stations is based on an arrangement of a set of multiple coverage areas of the set of multiple base stations, means for estimating, at the first base station, a trajectory of the UE based on the one or more sensors, and means for transmitting, from the first base station to a second base station of the set of multiple base stations via a backhaul interface, an indication to enter a first operating state and of one or more beams to enable after entering the first operating state based on the trajectory of the UE and the coverage pattern.

A non-transitory computer-readable medium storing code for wireless communication is described. The code may include instructions executable by a processor to determine, at a first base station of a set of multiple base stations, that a UE is located in a coverage area of one of the set of multiple base stations within a coverage pattern for the set of multiple base stations based on data from one or more sensors coupled with the first base station, a radio resource control state of the UE, or both, where the coverage pattern for the set of multiple base stations is based on an arrangement of a set of multiple coverage areas of the set of multiple base stations, estimate, at the first base station, a trajectory of the UE based on the one or more sensors, and transmit, from the first base station to a second base station of the set of multiple base stations via a backhaul interface, an indication to enter a first operating state and of one or more beams to enable after entering the first operating state based on the trajectory of the UE and the coverage pattern.

In some examples of the method, apparatuses, and non-transitory computer-readable medium described herein, estimating a trajectory of the UE may include operations, features, means, or instructions for predicting a transition of the UE from the coverage area of the first base station into a coverage area of the second base station.

Some examples of the method, apparatuses, and non-transitory computer-readable medium described herein may further include operations, features, means, or instructions for receiving, at the first base station from the second base station via the backhaul interface, a second indication that the second base station may have entered the first operating state based on transmitting the indication.

Some examples of the method, apparatuses, and non-transitory computer-readable medium described herein may further include operations, features, means, or instructions for transmitting, from the first base station to the second base station via the backhaul interface, a query about an operating state of the second base station and receiving, at the first base station from the second base station, a response to the query indicating the operating state of the second base station.

Some examples of the method, apparatuses, and non-transitory computer-readable medium described herein may further include operations, features, means, or instructions for transmitting, from the first base station to the second base station via the backhaul interface, a second indication of a quantity of UEs within a second coverage area of the second base station, the quantity of UEs being determined by the first base station based on the one or more sensors.

Some examples of the method, apparatuses, and non-transitory computer-readable medium described herein may further include operations, features, means, or instructions for transmitting, from the first base station to a third base station via the backhaul interface, a second indication to enter a second operating state based on the trajectory of the UE and the coverage pattern, where the first operating state may be an active state and the second operating state may be an inactive state.

Some examples of the method, apparatuses, and non-transitory computer-readable medium described herein may further include operations, features, means, or instructions for receiving, at the first base station from a third base station via the backhaul interface, a query about enabling an operating state of the third base station and transmitting, based on the query, a response to the third base station, the response including a second indication to enter a second operating state based on the trajectory of the UE and the coverage pattern.

Some examples of the method, apparatuses, and non-transitory computer-readable medium described herein may further include operations, features, means, or instructions for transmitting, from the first base station to one or more of the set of multiple base stations via the backhaul interface, a second indication that the first base station may have entered a second operating state.

Some examples of the method, apparatuses, and non-transitory computer-readable medium described herein may further include operations, features, means, or instructions for determining mobility information for the UE based on the data from one or more sensors, the mobility information including a velocity of the UE, a direction in which the UE may be travelling, or both, where estimating the trajectory of the UE may be based on the mobility information.

Some examples of the method, apparatuses, and non-transitory computer-readable medium described herein may further include operations, features, means, or instructions for determining transmission information for the UE including a direction of arrival for transmissions, a time of arrival for transmissions, one or more beams selected by the UE, or any combination thereof, where estimating the trajectory of the UE may be based on the transmission information.

Some examples of the method, apparatuses, and non-transitory computer-readable medium described herein may further include operations, features, means, or instructions for determining the radio resource control state of the UE, where estimating the trajectory of the UE may be based on the radio resource control state.

In some examples of the method, apparatuses, and non-transitory computer-readable medium described herein, estimating the trajectory of the UE may include operations, features, means, or instructions for estimating the trajectory of the UE based on temporal mobility based traffic patterns of UEs within the coverage pattern, geographical information associated with travelling across the coverage pattern, or any combination thereof.

Some examples of the method, apparatuses, and non-transitory computer-readable medium described herein may further include operations, features, means, or instructions for determining, at the first base station, the coverage pattern for the set of multiple base stations.

In some examples of the method, apparatuses, and non-transitory computer-readable medium described herein, determining the coverage pattern for the set of multiple base stations may include operations, features, means, or instructions for receiving the coverage pattern from a network entity that may be coupled with the set of multiple base stations.

In some examples of the method, apparatuses, and non-transitory computer-readable medium described herein, determining the coverage pattern for the set of multiple base stations may include operations, features, means, or instructions for determining a set of multiple coverage areas for a set of multiple cells supported by the set of multiple base stations and combining the set of multiple coverage areas to obtain the coverage pattern based on the determining.

In some examples of the method, apparatuses, and non-transitory computer-readable medium described herein, determining the set of multiple coverage areas may include operations, features, means, or instructions for determining, for each base station of the set of multiple base stations, coverage areas of one or more cells supported by a respective base station based on one or more blockages affecting the coverage area of the respective base station.

In some examples of the method, apparatuses, and non-transitory computer-readable medium described herein, determining the set of multiple coverage areas may include operations, features, means, or instructions for using a machine learning algorithm to estimate a temporal variation of the set of multiple coverage areas based on current blockages, recurring blockages, a time of day, reported channel state information, or any combination thereof.

In some examples of the method, apparatuses, and non-transitory computer-readable medium described herein, the data from the one or more sensors used to determine that the UE may be located within the coverage area of the first base station includes visual data, location data, coverage data, light based ranging data, radio based ranging data, global positioning data, signal reception data, or any combination thereof.

In some examples of the method, apparatuses, and non-transitory computer-readable medium described herein, the one or more sensors include a camera, a radar detector, a lidar detector, a global positioning system component, a signal reception component, or any combination thereof.

DETAILED DESCRIPTION

Figure 1:
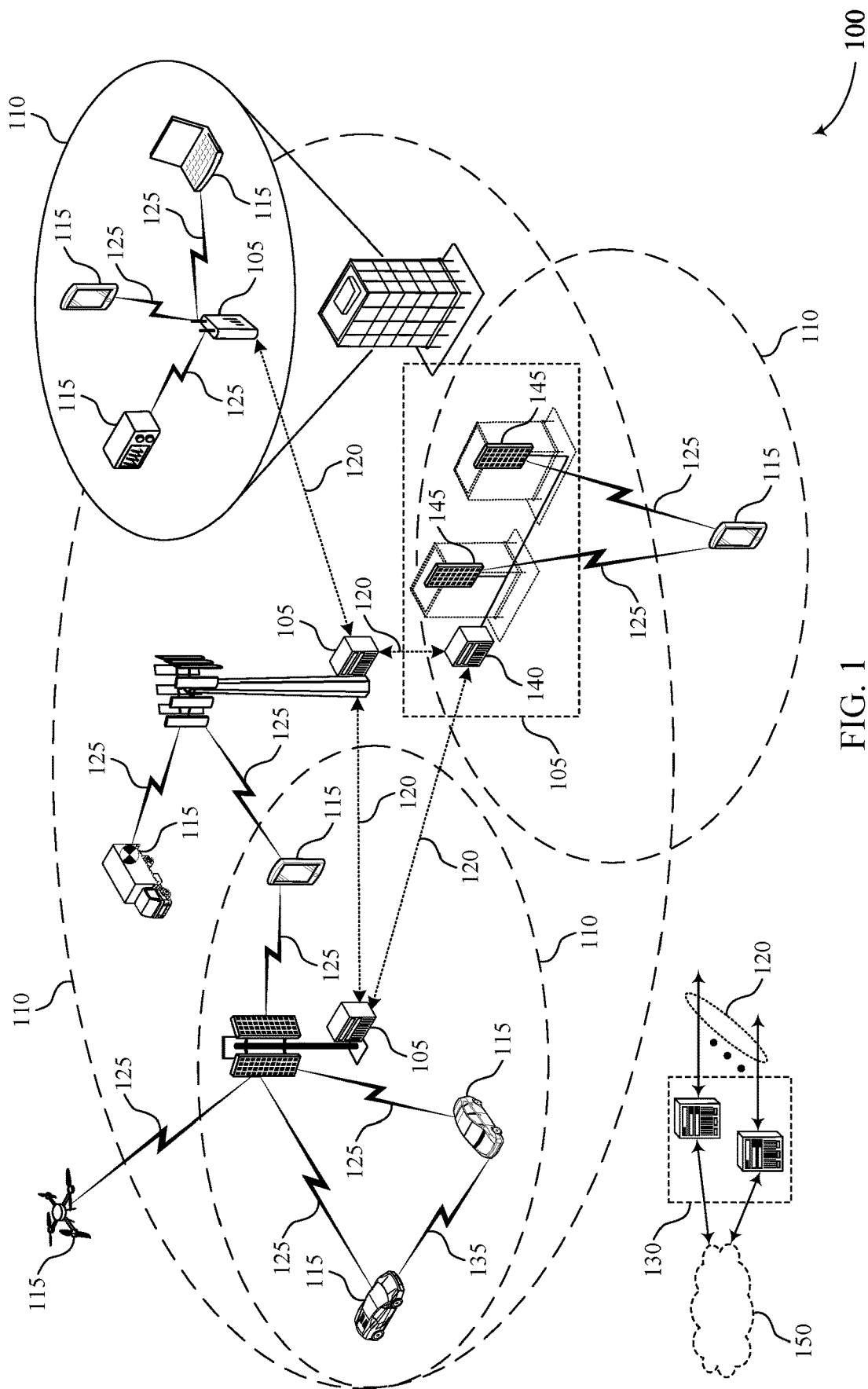
FIG. 1 illustrates an example of a wireless communications system that supports network-supported power management for base stations in accordance with aspects of the present disclosure.

A radio access network may include different types of access devices, such as base stations. In some examples, a radio access network includes base stations that are coupled with or include sensing equipment that is used to improve a performance of the radio access network. Also, some base stations support communications over higher frequency bands than other base stations. In some examples, a radio access network that supports communications over high frequency bands (e.g., millimeter wave or sub-Terahertz bands) may employ an increased quantity of base stations to cover a same geographic region coverable by a smaller quantity of base stations that support communications over lower frequency bands. But supporting an increased quantity of base stations may, in some examples, increase a power consumption of a radio network. Additionally, supporting an increased quantity of base stations may, in some examples, increase an amount of intercell interference that may occur within a radio network.

To reduce a power consumption of a radio network while also decreasing intercell interference, procedures that enable base stations to transition between a first operating state (e.g., an active state, a high-power state, a normal state, etc.) and a second operating state (e.g., an inactive state, an off state, a reduced-activity state, a reduced-power state, a low-power state, etc.) may be established. In the present disclosure, a first operating state of a base station may refer to a normal or fully operational state of a base station while a second operating state may refer to an operational state of the base station with reduced power consumption—e.g. by operating with reduced functionality as compared to the normal operational state. In some examples, operations that support wireless communications may be ceased in the second operating state—e.g., the base station may stop transmitting synchronization and reference signals and may not send control and data transmissions. In some examples, a set of beams may be deactivated while a base station is in the second operating state—e.g., the base station may stop transmitting synchronization and reference signals and may not send control and data transmissions on this set of beams. In some examples, the second operating state of a base station may comprise a sleep state of some or all components of the base station. In other examples, the second operating state of a base station may comprise an off state of some components of the base station. In some examples, the second operating state of the base station permits at least communications with one or more other base stations or one or more network entities using backhaul interfaces.

In some examples, a base station may enter the second operating state after determining that no UEs are within a vicinity of the base station—e.g., using sensor equipment that is coupled with the base station—or otherwise becoming aware from another device that no UEs are within a vicinity of the base station. In some examples, the vicinity of the base station may be given by or include a coverage area of the base station. The vicinity of the base station may include an area with a predefined radius including the coverage area of the base station. In some examples, the base station may enter the second operating state after also determining or otherwise becoming aware that no UEs have a radio resource control (RRC) connection (e.g., RRC-connected, RRC-idle, etc.) with the base station. The base station may remain in the second operating state until a UE enters or is about to enter a coverage area of the base station. By supporting operations that enable the base station to wake up before the UE enters the coverage area, the power saving operation of the base station may go unnoticed by the UE, and the network of power-saving base stations may provide continuous (e.g., undisrupted) communication service to the UE, among other benefits.

In some examples, the base station may use information received from neighboring base stations to determine whether to return to the active state—e.g. based on a UE entering a coverage area of the base station. In some examples, a network entity may also be used to support the power saving operation of the base station. For example, a network entity may determine a coverage pattern for a network of base stations—e.g., based on information received from the base stations. In some examples, the network entity may determine the coverage pattern at a beam level, for example, determining a coverage pattern that is based on a coverage area of each beam supported by a base station. In some examples, the network entity may use a machine learning algorithm that processes the information received from the base stations to determine the coverage pattern—e.g., as a function of time. The neighboring base stations may use the coverage pattern determined by the network entity to determine whether a UE is entering (or will enter) a coverage area of another base station, and various signaling may occur to communicate whether the UE is entering (or will enter) the coverage area of the other base station.

In addition to using the determined coverage pattern, the neighboring base station may determine and use various other information, such as mobility information, for a UE to determine whether a UE is entering (or will enter) a coverage area of another base station. In some examples, a neighboring base station uses sensing equipment, or knowledge of a geographic region to determine a trajectory a UE, or both. The neighboring base station may compare the trajectory of the UE with the determined coverage pattern and determine that the UE is entering (or will enter) a coverage area of another base station. In some examples, the neighboring base station may send an indication to the other base station, informing the other base station that a UE is (or will be) entering the coverage area of the other base station. In some examples, the other base station may transition from the second operating state to the first operating state (e.g., from an inactive state to the active state) based on receiving the indication.

Aspects of the disclosure are initially described in the context of wireless communications systems. Aspects of the disclosure are also described in the context of process flows showing signaling exchanges between wireless devices. Aspects of the disclosure are further illustrated by and described with reference to apparatus diagrams, system diagrams, and flowcharts that relate to network-supported power management for base stations.

FIG. 1 illustrates an example of a wireless communications system 100 that supports network-supported power management for base stations in accordance with aspects of the present disclosure. The wireless communications system 100 may include one or more base stations 105, one or more UEs 115, and a core network 130. In some examples, the wireless communications system 100 may be a Long-Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or another network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or another interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol)

and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. In some examples, a small cell may be associated with communications that use higher frequencies. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A wireless communications system 100 may include a network of base stations 105, where the base stations 105 may have overlapping coverage areas that collectively cover a geographic region. In some examples, the base stations 105 may be coupled with sensor equipment and may be referred to as sensor fusion gNBs or sensor fusion base stations. The sensor equipment may include one or more sensors configured to detect the presence of a UE in a coverage area of the respective base station. Additionally, or alternatively, the sensor equipment may include one or more sensors configured to locate a UE in the coverage area. Additionally, or alternatively, the sensor equipment may include one or more sensors configured to obtain mobility information of the UE, such as a direction of motion and/or a velocity of the motion. The sensor equipment may include at least one of one or more cameras, one or more radar components, one or more lidar components, one or more positioning components, one or more global positioning system (GPS) components, and the like. The base stations 105 may use information obtained by the sensor equipment to improve an operation of a radio network. For example, the base stations 105 may use the information to determine an optimal beam for a UE 115, to identify blockages, to determine mobility information for a UE 115, and the like.

A wireless communications system 100 may support different radio access technologies that support communications within the wireless communications system 100. For example, a wireless communications system 100 may support a 4G technology and a 5G technology. Additionally, or alternatively, a wireless communications system 100 may support communications over a wide range of frequencies, including high frequencies (e.g., millimeter wave frequencies or sub-Terahertz frequencies) and low frequencies. In some examples, communications over higher frequencies attenuate more quickly (in shorter distances) than communications over lower frequencies. Also, communications using higher frequencies may be more susceptible to blockages that enter the path of a communication. Thus, a coverage area of base stations 105 that support high frequency communications may change over time (as blockages enter and exit a coverage area) and be less predictable than a coverage area of base stations 105 that support lower frequency communications.

In some examples, base stations 105 coupled with sensing equipment may be used to improve an operation of a network of base stations 105 that supports communications in higher frequency ranges. For example, base stations 105 may use sensors to determine a set of one or more beams to enable—e.g., based on identifying blockages using a camera. Also, a network entity may use sensors to determine a beam to use for transmissions to a UE 115—e.g., based on identifying a position of a UE 115. Also, in some examples, wireless communications systems 100 (or components of wireless communications system 100) may use a modified radio network infrastructure to support high frequency communications. For example, to support high frequency communications, a wireless communications system 100 may include an increased quantity of base stations 105 that have smaller coverage areas than a network of base stations 105 used to support lower frequency communications—e.g., due to a diminished ability of high frequency communications to penetrate blockages. But supporting an increased quantity of base stations may increase a power consumption of a radio network in some examples. Additionally, supporting an increased quantity of base stations may increase an amount of intercell interference that may occur within a radio network.

To reduce a power consumption of a radio network while also decreasing intercell interference, among other benefits, procedures that enable base stations to transition between different operating states described above and herein, such as a first operating state (e.g., an active state, a high-power state, a normal state, etc.) and a second operating state (e.g., an inactive state, an off state, a reduced-activity state, a reduced-power state, a low-power state, etc.), may be established. In some examples, a base station may enter an inactive state after determining whether UEs (e.g., determining that no UEs) are within a vicinity of the base station—e.g., using sensor equipment that is coupled with the base station. In some examples, the base station may enter the inactive state after also determining no UEs have an RRC connection (e.g., RRC-connected, RRC-idle, etc.) with the base station. The base station may remain in the inactive state until a UE enters or is about to enter a coverage area of the base station. By supporting operations that enable the base station wakes up before the UE enters the coverage area, the power savings operation of the base station may go unnoticed by the UE, and the network of power-saving base stations may provide continuous (e.g., undisrupted) communication service to the UE.

In some examples, the base station may use information received from neighboring base stations to determine whether to return to the active state—e.g. based on a UE entering a coverage area of the base station. In some examples, a network entity may also be used to support the power saving operation of the base station. For example, a network entity, which may be an MME in some examples, may determine a coverage pattern for a network of base stations—e.g., based on information received from the base stations. In some examples, the network entity may determine the coverage pattern at a beam level, determining a coverage pattern that is based on a coverage area of each beam supported by a base station. In some examples, the network entity uses a machine learning algorithm that processes the information received from the base stations to determine the coverage pattern— e.g., as a function of time. The neighboring base stations may use the coverage pattern determined by the network entity to determine whether a UE is entering (or will enter) a coverage area of another base station.

In addition to using the determined coverage pattern, the neighboring base station may determine and use, for example, mobility information for a UE to determine whether a UE is entering (or will enter) a coverage area of another base station. In some examples, a neighboring base station uses sensing equipment, or knowledge of a geographic region to determine a trajectory a UE, or both. The neighboring base station may compare the trajectory of the UE with the determined coverage pattern and determine that the UE is entering (or will enter) a coverage area of another base station. In some examples, the neighboring base station may send an indication to the other base station, informing the other base station that a UE is (or will be) entering the coverage area of the other base station. In some examples, the other base station may transition from one state to another state, such as an inactive state to an active state, based on receiving the indication.

Figure 2:
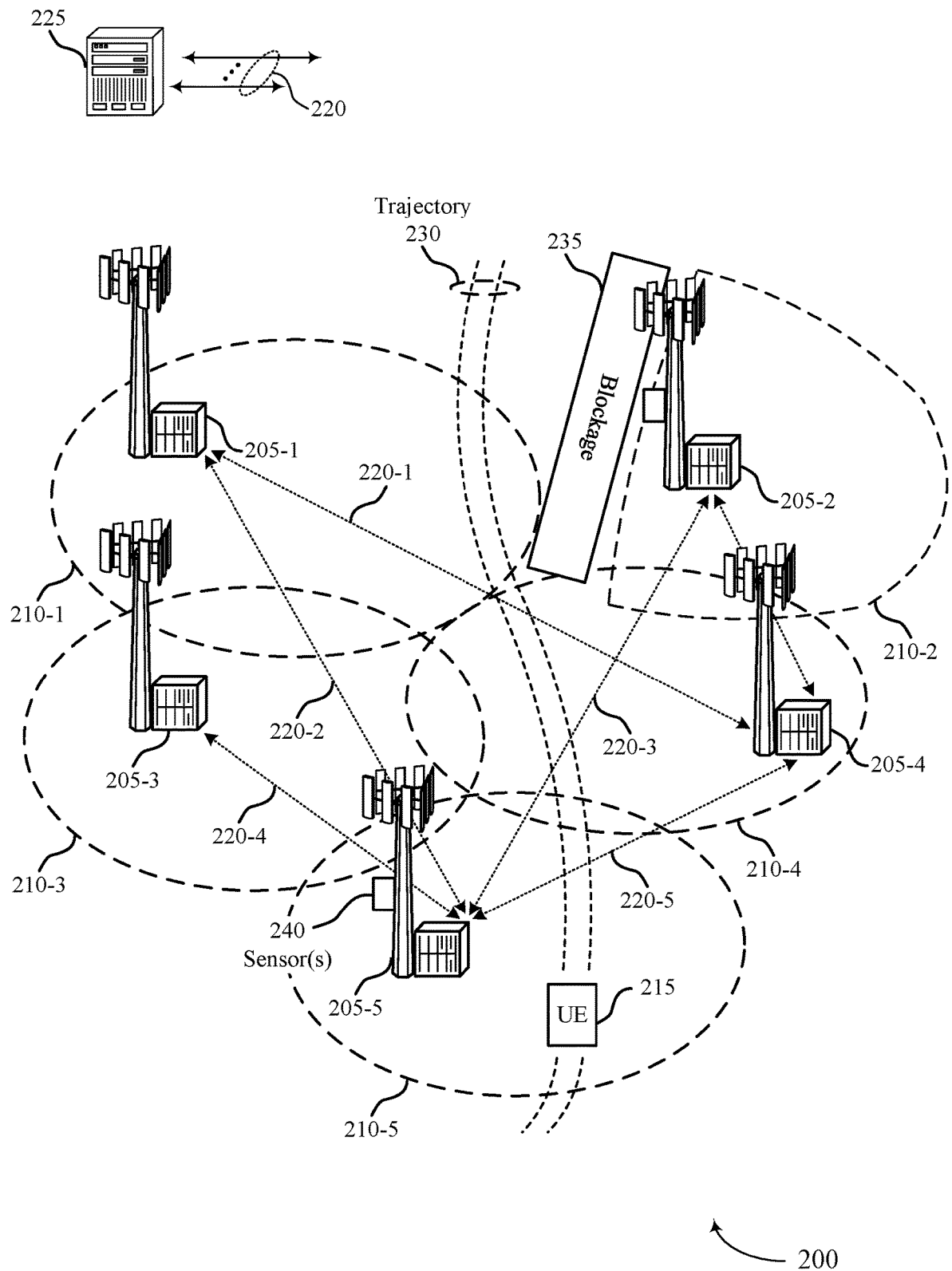
FIG. 2 illustrates an example of a wireless communications subsystem that supports network-supported power management for base stations in accordance with aspects of the present disclosure.

FIG. 2 illustrates an example of a wireless communications subsystem 200 that supports network-supported power management for base stations in accordance with aspects of the present disclosure.

Wireless communications subsystem 200 may include multiple base stations 205 and multiple UEs (such as UE 215), which may be examples of a base station 105 and a UE 115 described in FIG. 1. The base stations 205 may communicate with UE 215 when UE 215 is positioned within a respective coverage area 210, as similarly described with reference to FIG. 1. Also, the base stations 205 may communicate with one another and a network entity using backhaul interfaces 220, as similarly described with reference to FIG. 1. UE 215 may be a vehicle (e.g., a car or bus), a personal electronic device, and the like.

A network of base stations 205 may be deployed to cover a geographic region, which may include permanent or semi-permanent geographic features, such as homes, office buildings, streets, hills, mountains, trees, and the like. In some examples, the coverage areas 210 of the base stations may be based on these geographic features or other environmental features. For example, a second coverage area 210-2 of second base station 205-2 may be unevenly distributed around second base station 205-2 based on blockage 235 being positioned next to second base station 205-2. In some examples, blockage 235 is a permanent or semi-permanent blockage, such as a building. In other examples, blockage 235 may be a temporary blockage, such as a large vehicle (e.g., bus or tractor trailer). In some examples, temporary blockages may be classified as semi-permanent blockages (e.g., if the blockage is recurring or immobilized). In some examples, when a significant portion of a coverage area is blocked, a base station may increase an amount of power available to transmit beams that are not affected by the blockage. For example, second base station 205-2 may increase an amount of power available to transmit beams that are directed away from blockage 235.

In some examples, the base stations 205 may determine various coverage areas, for example boundaries of their coverage areas, e.g., based on data obtained using attached sensing equipment and channel information reported by UEs. For example, second base station 205-2 may identify blockage 235 using a sensor such as a camera. Or second base station 205-2 may identify blockage 235 after determining that UEs on the other side of blockage 235 are reporting (e.g., consistently reporting) that the channel quality is poor. The base stations 205 may send information regarding the boundaries of their coverage areas to network entity 225. In some examples, network entity 225 may use the information to determine a coverage pattern for the network of base stations 205, identifying which base stations 205 cover which regions of a larger geographic area. A coverage pattern may thus include multiple coverage areas associated with corresponding base stations. In some examples, the coverage pattern determined by network entity 225 is a function of time—that is, the boundaries of the individual coverage areas may change based on a time of day, or a day of the week, or various other factors.

In some examples, network entity 225 may use a machine learning algorithm to determine the individual coverage areas as a function of time. Also, in some examples, network entity 225 may determine the coverage pattern on a per-beam basis. That is, network entity 225 may determine a coverage area of each beam supported by each of base stations 205. For example, network entity 225 may determine that a first set of beams supported by second base station 205-2 cover second coverage area 210-2 and that a second set of beams supported by second base station 205-2 are underutilized. In some examples, the machine learning algorithm may include an artificial neural network that is used to model the coverage pattern of the base stations 205. The artificial neural network may include the coverage area of the base stations 205 as nodes in the artificial neural network, and transitions/handovers of UEs between base stations as edges of the artificial neural network. In some examples, node cloning may be used to represent different times of the day.

In some examples, the base stations 205 may support a power management operation that enables the base stations 205 to transition between an active state and inactive state (e.g., low-power state, off state, etc.). For example, the base stations 205 may be configured to enter an inactive state when no UEs are identified within a respective coverage area, or a respective base station has no established RRC connections (e.g., no RRC-idle or RRC-connected connections), or both. While in the inactive state, a base station may cease at least some operations that support wireless communications—e.g., the base station may stop transmitting synchronization and reference signals and may not send control and data transmissions. In some examples, while in the inactive state, the base station may cease such operations that support wireless communications on certain beams while continuing these operations on other beams. In some examples, after entering an inactive state, a base station 205 may send a sleep notification signal to neighboring base stations via a backhaul interface 220. For example, fourth base station 205-4 may send a sleep notification signal to first base station 205-1, second base station 205-2, third base station 205-3, and fifth base station 205-5 via backhaul interfaces 220. The signaling procedures that support signaling sleep notification signals to other base stations are described in more detail herein and with reference to FIG. 3A, among other sections.

In some examples, a base station 205 may send an operating state query signal to determine an operating state of neighboring base stations via a backhaul interface 220. For example, fifth base station 205-5 may send an operating state query signal to first base station 205-1, second base station 205-2, third base station 205-3, and fourth base station 205-4 via backhaul interfaces 220—e.g., after identifying that UE 215 has entered or is about to enter fifth coverage area 210-5. And first base station 205-1, second base station 205-2, third base station 205-3, and fourth base station 205-4 may respond to fifth base station 205-5 indicating respective operating states. The signaling procedures that support signaling operating state query signals to other base stations are described in more detail herein and with reference to FIG. 3B, among other sections.

In some examples, before entering an inactive state, a base station 205 may send a sleep enable query to another base station 205 to determine whether to enter an inactive state. For example, fourth base station 205-4 may send a sleep enable query signal to fifth base station 205-5, and fifth base station 205-5 may send a response indicating to fourth base station 205-4 a quantity of UEs in fifth coverage area 210-5, a quantity of UEs detected in fourth coverage area 210-4, a trajectory of UEs in fifth coverage area 210-5, or any combination thereof. Fourth base station 205-4 may use the information included in the response to determine whether to enter the inactive state—e.g., fourth base station 205-4 may not enter the inactive state if the response indicates that a trajectory of one or more UEs in fifth coverage area 210-5 passes through fourth coverage area 210-4. The signaling procedures that support signaling sleep enable query signals to other base stations are described in more detail herein and with reference to FIG. 3C, among other sections.

In some examples, first base station 205-1, second base station 205-2, third base station 205-3, and fourth base station 205-4 may be in an inactive state when UE 215 enters fifth coverage area 210-5. And fifth base station 205-5 may be in an active state—e.g., based on identifying that UE 215 has entered fifth coverage area 210-5 or based on receiving an alert that UE 215 is entering fifth coverage area 210-5 from another base station 205. In other examples, a subset (or none) of first base station 205-1, second base station 205-2, third base station 205-3, and fourth base station 205-4 may be in an inactive state when UE 215 enters fifth coverage area 210-5.

In some examples, fifth base station 205-5 may be equipped with one or more sensors 240 that is or are capable of detecting or identifying UEs within fifth coverage area 210-5, determining mobility information about UEs identified within fifth coverage area 210-5, or both. In some examples, sensor 240 includes a camera that identifies UE 215 and is used to determine a position, or velocity, or both of UE 215. Sensor 240 may additionally, or alternatively, include radar equipment, lidar equipment, or both to determine a position and velocity of UE 215. Sensor 240 may additionally, or alternatively, include GPS equipment that may be used to determine a position and velocity of UE 215 (e.g., based on GPS data received from UE 215). Sensor 240 may additionally, or alternatively, include signal processing components that enable fifth base station 205-5 to determine a position of UE 215 within fifth coverage area 210-5 based on determining a time and angle of arrival of signals transmitted from UE 215. In some examples, sensor 240 may include any combination of sensing equipment, among other examples, where equipment that serves similar purposes (e.g., redundant equipment) and is included in sensor 240 may be used to refine a position estimate, velocity estimate, or both for UE 215.

In addition to determining a position and velocity for UE 215 (or alternatively to determining a position and velocity for UE 215), fifth base station 205-5 may determine trajectory 230 for UE 215. In some examples, fifth base station 205-5 may use the position and velocity information determined for UE 215 in combination with geographic, or temporal information (or both) determined for the geographic area covered by the network of base station 205 to determine trajectory 230. For example, fifth base station 205-5 may determine a path of UE 215 based on a pattern of streets, speed of UE 215, or both. Additionally, or alternatively, fifth base station 205-5 may determine a path of UE 215 based on an automobile traffic pattern for a time of day—e.g., fifth base station 205-5 may determine that UE 215 is likely to follow the highest traveled route for that time of day. While shown in FIG. 2 as a detailed path of motion for the UE 215, trajectory 230 may be limited to a sequence of transitions between coverage areas 210, possibly associated with transition probabilities.

In some examples, fifth base station 205-5 uses a machine learning algorithm to determine trajectory 230 for UE 215, where the machine learning algorithm may take into account a position of UE 215, a velocity of UE 215, a direction that UE 215 is headed, temporal traffic patterns, street layouts, road closures, current traffic information, or any combination thereof. In some examples, these parameters are inputted into the machine learning algorithm including a trained neural network that outputs trajectory 230 based on the different inputs. In some examples, the machine learning network is trained based on obtaining these parameters for each UE that enters a coverage area of fifth base station 205-5 and analyzing the resulting trajectories for each parameter/trajectory pair. In some examples, fifth base station 205-5 sends position, velocity, or direction information, or any combination thereof to network entity 225, and network entity 225 determines trajectory 230 for UE 215—e.g., using a machine learning algorithm. In some examples, trajectory 230 may be a sequence of one or more mostly likely transitions between coverage areas 210 predicted by the machine learning algorithm. The trajectory 230 may include time information associated with the transitions from one coverage area to the next coverage area.

In some examples, the machine learning algorithm is a pre-trained model, a reinforced learning model (e.g., a model that is refined during operation), a federated learning model (e.g., a model that is updated based on feedback from a large quantity of UEs), or a combination thereof. In some examples, the machine learning algorithm may include an artificial neural network that is used to model the trajectory of the UEs. The artificial neural network may include coverage areas of base stations 205 as nodes, and handovers of UEs as edges of the neural network. In some examples, available network information, such as a road network, may be used to prune the artificial neural network. And available mobility-based traffic information may be used to pre-condition the artificial neural network. In some examples, procedures for training the artificial neural network may include using backhaul communications to confirm a predicted trajectory of UEs. In some examples, the artificial neural network is implemented by network entity 225. In other examples, the artificial neural network is distributed among the base stations 205. Additionally, in some examples, the machine learning algorithm used to model the coverage pattern of the base stations 205 may be used to refine the machine learning algorithm used to model the trajectory of the UEs—e.g., by indicating the presence of a blockage to the machine learning algorithm used to model the trajectory of the UEs.

Fifth base station 205-5, network entity 225, or both may compare trajectory 230 with the coverage pattern determined for the network of base stations 205—e.g., by overlaying trajectory 230 over the coverage pattern. Thus, fifth base station 205-5, network entity 225, or both may determine the coverage areas of which base stations 205 UE 215 is projected to travel through. After comparing trajectory 230 for UE 215 with the determined coverage pattern, a backhaul interface 220 (e.g., an X2 interface) may be used to signal to other base stations 205 information that can be used by a receiving base station 205 to determine whether to maintain a current operating state. In some examples, fifth base station 205-5 may send a sleep enable signal to base stations 205 that are not in the path of trajectory 230, such as third base station 205-3 and second base station 205-2. In some examples, second base station 205-2 receives the sleep enable signal and enters or remains in an inactive state based on the information included in the sleep enable signal. In some examples, fifth base station 205-5 sends sleep enable signals exclusively to base stations outside the path of trajectory 230 that have been identified as being in an active state—e.g., based on an earlier operating state query signal sent by fifth base station 205-5. In some examples, the sleep enable signals indicate trajectory 230 for UE 215, and the base stations 205 that receive the sleep enable signal may deactivate sets of beams based on trajectory 230 relative to a direction of the sets of beams. For example, third base station 205-3 may deactivate a set of beams that is directed away from trajectory 230. The signaling procedures that support signaling sleep enable signals to other base stations are described in more detail herein and with reference to FIG. 4A, among other sections.

Fifth base station 205-5 (or network entity 225) may also send a wakeup signal to base stations in the path of trajectory 230, such as fourth base station 205-4 and, in some examples, also first base station 205-1. In some examples, fourth base station 205-4 receives the wakeup signal and enters or remains in an active state. Fourth base station 205-4 may transmit a response (e.g., a wakeup complete signal) to fifth base station 205-5 indicating that fourth base station 205-4 is in the active state. In some examples, fifth base station 205-5 may include in a wakeup signal an indication of a set of beams for fourth base station 205-4 to enable—e.g., based on trajectory 230 and the coverage area of the intended base station. And the fourth base station 205-4 may activate the indicated set of beams. In some examples, the wakeup signal may include an indication of trajectory 230, and base stations 205 that receive the wakeup signal may activate a set of beams based on trajectory 230. In some examples, fifth base station 205-5 sends wakeup signals exclusively to base stations in the path of trajectory 230 that have been identified as being in an inactive state—e.g., based on an earlier operating state query signal sent by fifth base station 205-5. The signaling procedures that support signaling wakeup signals to other base stations is described in more detail herein and with reference to FIG. 4B, among other sections.

Accordingly, fourth base station 205-4 may be in an active state when UE 215 enters fourth coverage area 210-4. Additionally, or alternatively, fourth base station 205-4 may activate a set of beams that covers a path of trajectory 230 through fourth coverage area 210-4. Fourth base station 205-4 may determine mobility information for UE 215, as similarly described with reference to fifth base station 205-5. In some examples, fourth base station 205-4 (or network entity 225, or both) may refine the estimate for trajectory 230 or determine a new trajectory. After determining trajectory 230 (or a newly estimated trajectory) passes through first coverage area 210-1, fourth base station 205-4 may send a wakeup signal to first base station 205-1—e.g., if fourth base station 205-4 determines (or has not already determined) that first base station 205-1 is in an inactive state. Thus, first base station 205-1 may be in an active state (and, in some examples, a set of beams that covers trajectory 230 may be active) when UE 215 enters first coverage area 210-1. By using a determined coverage pattern and trajectory 230, the radio network may increase the likelihood that base stations 205 whose coverage areas will not encompass UE 215, such as second base station 205-2, remain in the inactive state, while also enabling base stations 205 that are in the path of UE 215 to enter an active state before UE 215 enters a respective coverage area 210.

Figure 3A:
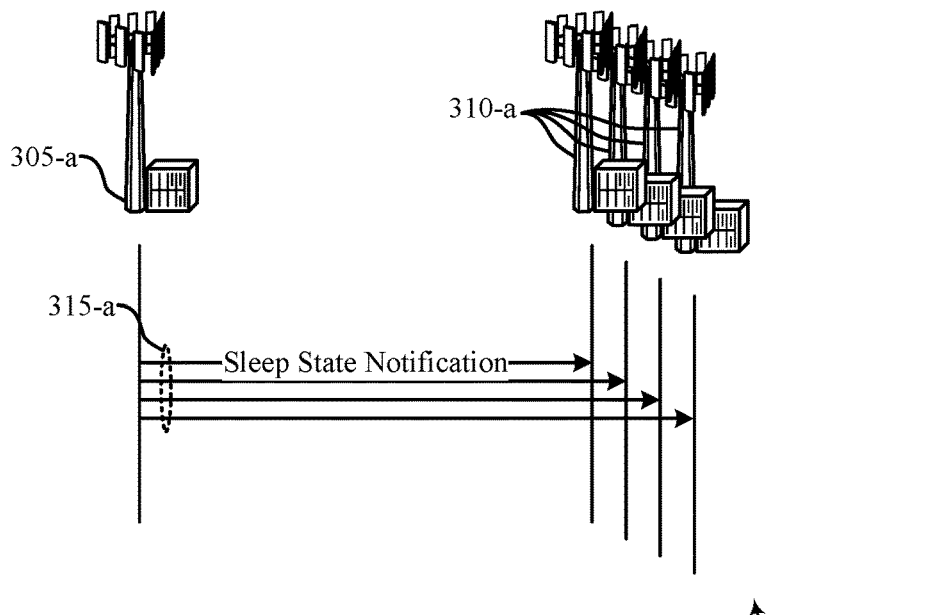
FIGS. 3A through 3C illustrate example process flows that support network-supported power management for base stations in accordance with aspects of the present disclosure.

FIG. 3A illustrates an example of a process flow 300-a that supports network-supported power management for base stations in accordance with aspects of the present disclosure.

Process flow 300-a may be performed by first base station 305-a and multiple base stations 310-a, among other examples, which may be examples of base stations described above with reference to FIGS. 1 and 2. In some examples, first base station 305-a, one or more of the multiple base stations 310-a, or both may include sensing equipment. In some examples, process flow 300-a illustrates an exemplary sequence of operations performed to support network-support power management for base stations. For example, process flow 300-a depicts operations for notifying other base stations that a base station has entered an inactive state.

It is understood that one or more of the operations described in process flow 300-a may be performed earlier or later in the process, omitted, replaced, supplemented, or performed in combination with another operation. Also, additional operations described herein that are not included in process flow 300-a may be included.

At 315-a, first base station 305-a may transmit (e.g., via an X2 interface) a sleep state notification to multiple base stations 310-a. The sleep state notification may include an identity of first base station 305-a, an indication that first base station 305-a has entered an inactive state, or both. In some examples, the sleep state notification may indicate that a set of beams supported by first base station 305-a are inactive. In some examples, first base station 305-a may similarly transmit an active state notification to multiple base stations 310-a, indicating that first base station 305-a has entered an active state.

In some examples, first base station 305-a transmits the sleep state notification after determining that no UEs are in a vicinity of first base station 305-a, no UEs have an RRC connection to first base station 305-a, receiving an indication that no UEs are in a vicinity of first base station 305-a from another base station, or any combination thereof. In some examples, first base station 305-a may periodically surveil a coverage area of first base station 305-a for UEs. In some examples, first base station 305-a transmits the sleep state notification in a broadcast message.

Figure 3B:
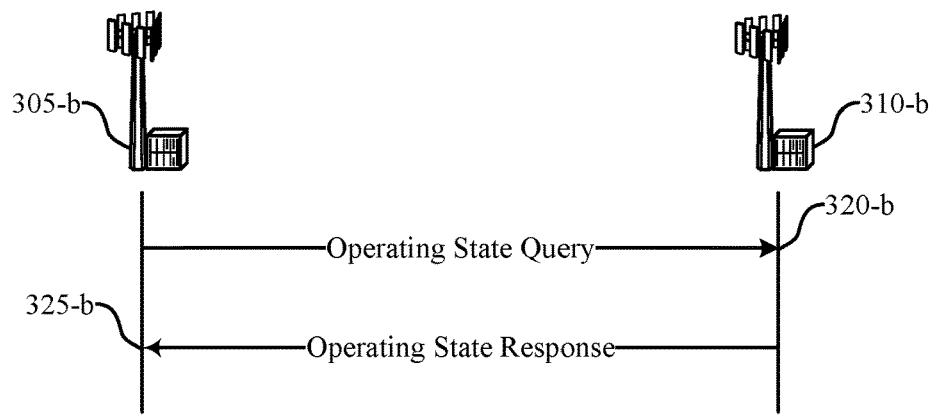

FIG. 3B illustrates an example of a process flow 300-b that supports network-supported power management for base stations in accordance with aspects of the present disclosure.

Process flow 300-b may be performed by first base station 305-b and second base station 310-b, among other examples, which may be examples of base stations described above with reference to FIGS. 1 and 2. In some examples, first base station 305-b, second base station 310-b, or both may include sensing equipment. In some examples, process flow 300-b illustrates an exemplary sequence of operations performed to support network-support power management for base stations. For example, process flow 300-b depicts operations for sending an operating state query to determine an operating state of another base station.

It is understood that one or more of the operations described in process flow 300-b may be performed earlier or later in the process, omitted, replaced, supplemented, or performed in combination with another operation. Also, additional operations described herein that are not included in process flow 300-b may be included.

At 320-b, first base station 305-b may transmit (e.g., via an X2 interface) an operating state query to second base station 310-b. The operating state query may include a request that second base station 310-b communicate an operating state of second base station 310-b to first base station 305-b. In some examples, first base station 305-b periodically transmits operating state queries to neighboring base stations to maintain an up-to-date list of which base stations are in which operating states. First base station 305-b may later use this information to determine whether to send a wakeup signal or sleep enable signal to the neighboring base stations—e.g., based on a determined trajectory of a UE. In some examples, base stations may periodically transmit operating states to one another—e.g., other base stations may periodically transmit their operating states to first base station 305-b.

At 325-b, second base station 310-b may transmit (e.g., via the X2 interface) an operating state response to first base station 305-b that indicates an operating state of second base station 310-b. For example, the operating state response may indicate that second base station 310-b is in an active state or an inactive state (e.g., a reduced-power state, standby state, or off state). In some examples, the operating state response may indicate a set of beams supported by second base station 310-b that are active and a set of beams supported by second base station 310-b that are inactive.

Figure 3C:
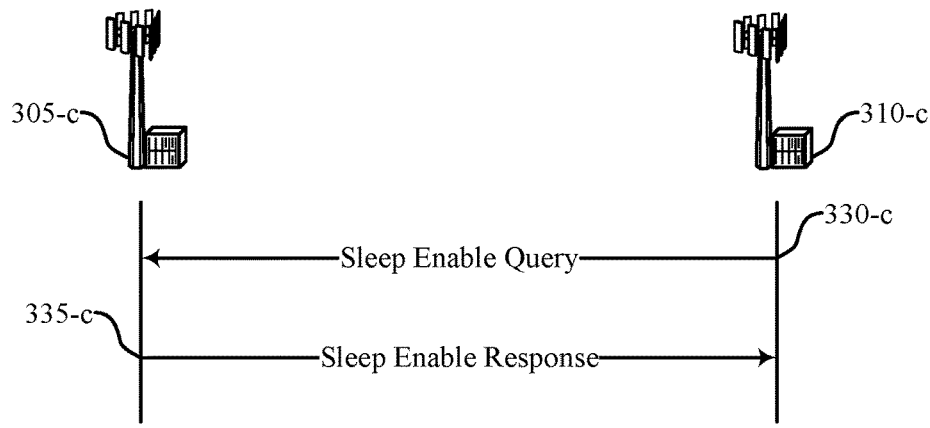

FIG. 3C illustrates an example of a process flow 300-c that supports network-supported power management for base stations in accordance with aspects of the present disclosure.

Process flow 300-c may be performed by first base station 305-c and second base station 310-c, among other examples, which may be examples of base stations described above with reference to FIGS. 1 and 2. In some examples, first base station 305-c, second base station 310-c, or both may include sensing equipment. In some examples, process flow 300-c illustrates an exemplary sequence of operations performed to support network-support power management for base stations. For example, process flow 300-c depicts operations for sending a sleep enable query to determine whether to enter an inactive state.

It is understood that one or more of the operations described in process flow 300-c may be performed earlier or later in the process, omitted, replaced, supplemented, or performed in combination with another operation. Also, additional operations described herein that are not included in process flow 300-c may be included.

At 330-c, second base station 310-c may transmit (e.g., via an X2 interface) a sleep enable query to first base station 305-c requesting information obtained at first base station 305-c that may be relevant to a determination of second base station 310-c as to whether to enter a sleep state. In some examples, second base station 310-c sends the sleep enable query after determining that no UEs are within a vicinity of second base station 310-c, no UEs have an RRC connection with second base station 310-c, or both. In some examples, second base station 310-c sends the sleep enable query to determine whether another base station has detected UEs in a vicinity of second base station 310-c that were missed by second base station 310-c, for example. In some examples, second base station 310-c sends the sleep enable query to determine whether another base station has determined UEs about to enter the coverage area of the second base station 310-c, for example.

At 335-*c*, first base station 305-*c* may transmit (e.g., via an X2 interface) a sleep enable response to second base station 310-*c*. In some examples, the sleep enable response includes a command directing second base station 310-*c* to enter an inactive state. In some examples, the sleep enable response includes information that second base station 310-*c* may use to determine whether to enter the inactive state. For example, the sleep enable response may indicate that first base station 305-*c* does not identify any UEs in a vicinity of second base station 310-*c*, such as in an overlap region of the coverage areas of the first base station 305-*c* and the second base station 310-*c*. Additionally, or alternatively, the sleep enable response may indicate a quantity of UEs positioned within a vicinity of first base station 305-*c*. Additionally, or alternatively, the sleep enable response may indicate whether a trajectory of any UEs in a vicinity of first base station 305-*c* is projected to enter a coverage area of second base station 310-*c* and may also indicate a position along the boundary of the coverage area where the UE is projected to enter.

In some examples, second base station 310-*c* enters an inactive state based on receiving an indication that first base station 305-*a* failed to detect any UEs in a vicinity of second base station 310-*c*, such as the above-mentioned overlap region. In some examples, second base station 310-*c* may deactivate a set of beams based on an indication of where a UE is projected to enter a coverage area of second base station 310-*c*. In some examples, second base station 310-*c* similarly enters or remains in an active state based on receiving an indication that first base station 305-*a* detected a UE in a vicinity of second base station 310-*c* or that a trajectory of a UE enters a coverage area of second base station 310-*c*. In some examples, second base station 310-*c* activates a set of beams based on a path of a trajectory of a UE within a coverage area of second base station 310-*c*.

Figure 4A:
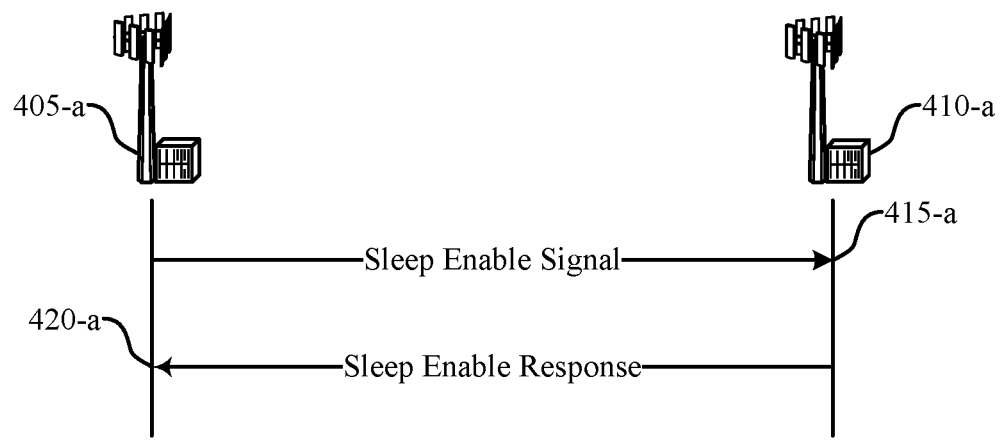
FIGS. 4A and 4B illustrate example process flows that support network-supported power management for base stations in accordance with aspects of the present disclosure.

FIG. 4A illustrates an example of a process flow 400-*a* that supports network-supported power management for base stations in accordance with aspects of the present disclosure.

Process flow 400-*a* may be performed by first base station 405-*a* and second base station 410-*a*, among other examples, which may be examples of base stations described above with reference to FIGS. 1 and 2. In some examples, first base station 405-*a*, second base station 410-*a*, or both may include sensing equipment. In some examples, process flow 400-*a* illustrates an exemplary sequence of operations performed to support network-support power management for base stations. For example, process flow 400-*a* depicts operations for sending a sleep enable signal to direct (or suggest) that another base station enter an inactive state.

It is understood that one or more of the operations described in process flow 400-*a* may be performed earlier or later in the process, omitted, replaced, supplemented, or performed in combination with another operation. Also, additional operations described herein that are not included in process flow 400-*a* may be included.

At 415-*a*, first base station 405-*a* may transmit (e.g., via an X2 interface) a sleep enable signal to second base station 410-*a*. In some examples, first base station 405-*a* transmits the sleep enable signal to second base station 410-*a* based on determining that there are no UEs in a vicinity of second base station 410-*a*, such as the above mentioned overlap region—e.g., based on sensors at first base station 405-*a*. Second base station 410-*a* may consider information included in the sleep enable signal when determining whether to enter an inactive state. In some examples, first base station 405-*a* transmits the sleep enable signal based on determining that a trajectory of a UE in a coverage area of first base station 405-*a* does not enter a coverage area of second base station 410-*a*. In some examples, first base station 405-*a* periodically surveils the vicinity of neighboring base stations and transmits sleep enable signals to a set of neighboring base stations after determining there are no UEs in a vicinity of the set of neighboring base stations.

In some examples, second base station 410-*a* enters the inactive state based on receiving the sleep enable signal. In other examples, second base station 410-*a* remains in the inactive state based on receiving the sleep enable signal. In other examples, second base station 410-*a* remains in the active state based on receiving the sleep enable signal—e.g., if second base station 410-*a* detects UEs in a vicinity of second base station 410-*a* that were missed by first base station 405-*a*.

At 420-*a*, second base station 410-*a* may transmit (e.g., via an X2 interface) a sleep enable response to first base station 405-*a*. In some examples, the sleep enable response includes an indication that second base station 410-*a* has entered an inactive state. In other examples, the sleep enable response includes an indication that second base station 410-*a* will remain in the active state despite receiving the sleep enable signal. In some examples, second base station 410-*a* indicates an intention to remain in the active state based on detecting a UE within a vicinity of second base station 410-*a*, identifying an RRC connection with a UE, or both.

Figure 4B:
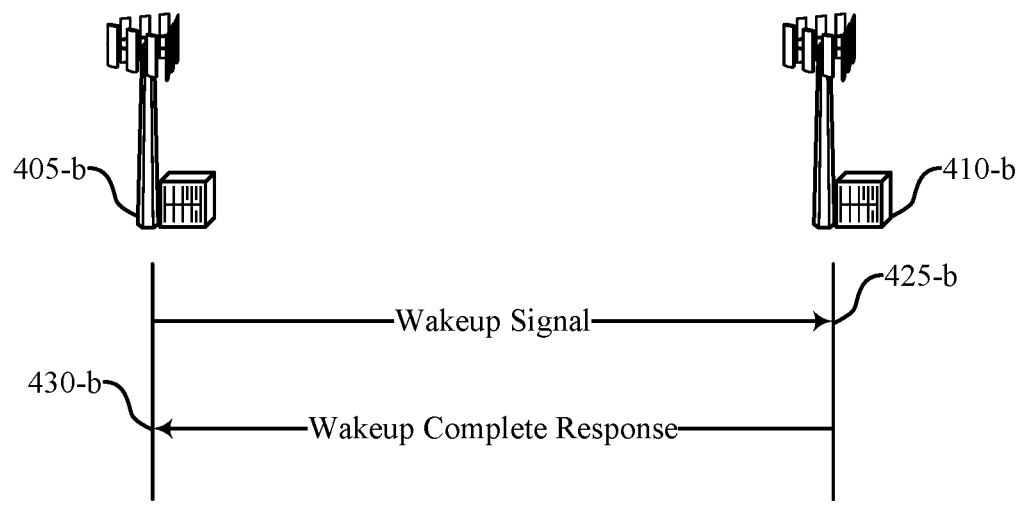

FIG. 4B illustrates an example of a process flow 400-*b* that supports network-supported power management for base stations in accordance with aspects of the present disclosure.

Process flow 400-*b* may be performed by first base station 405-*b* and second base station 410-*b*, among other examples, which may be examples of base stations described above with reference to FIGS. 1 and 2. In some examples, first base station 405-*b*, second base station 410-*b*, or both may include sensing equipment. In some examples, process flow 400-*b* illustrates an exemplary sequence of operations performed to support network-support power management for base stations. For example, process flow 400-*b* depicts operations for sending a wakeup signal to another base station.

It is understood that one or more of the operations described in process flow 400-*b* may be performed earlier or later in the process, omitted, replaced, supplemented, or performed in combination with another operation. Also, additional operations described herein that are not included in process flow 400-*b* may be included.

At 425-*b*, first base station 405-*b* may transmit a wakeup signal to second base station 410-*b*. Wakeup signal may include a command directing second base station 410-*b* to enter or remain in an active state. In some examples, wakeup signal may also include an indication of a set of beams for second base station 410-*b* to enable. In some examples, first base station 405-*b* periodically surveils the vicinity of neighboring base stations and transmits wakeup signals to a set of neighboring base stations after determining there are UEs in a vicinity of the set of neighboring base stations.

In some examples, second base station 410-*b* transitions from the inactive state to the active state based on receiving the wakeup signal. In other examples, second base station 410-*b* is already in the active state, and thus, remains in the active state based on receiving the wakeup signal.

At 430-*b*, second base station 410-*b* may transmit a wakeup complete response to first base station 405-*b*. The wakeup complete response may indicate that second base station 410-*b* is in an active state. In some examples, the wakeup complete response may indicate that a set of beams indicated by the wakeup signal are active.

Figure 5:
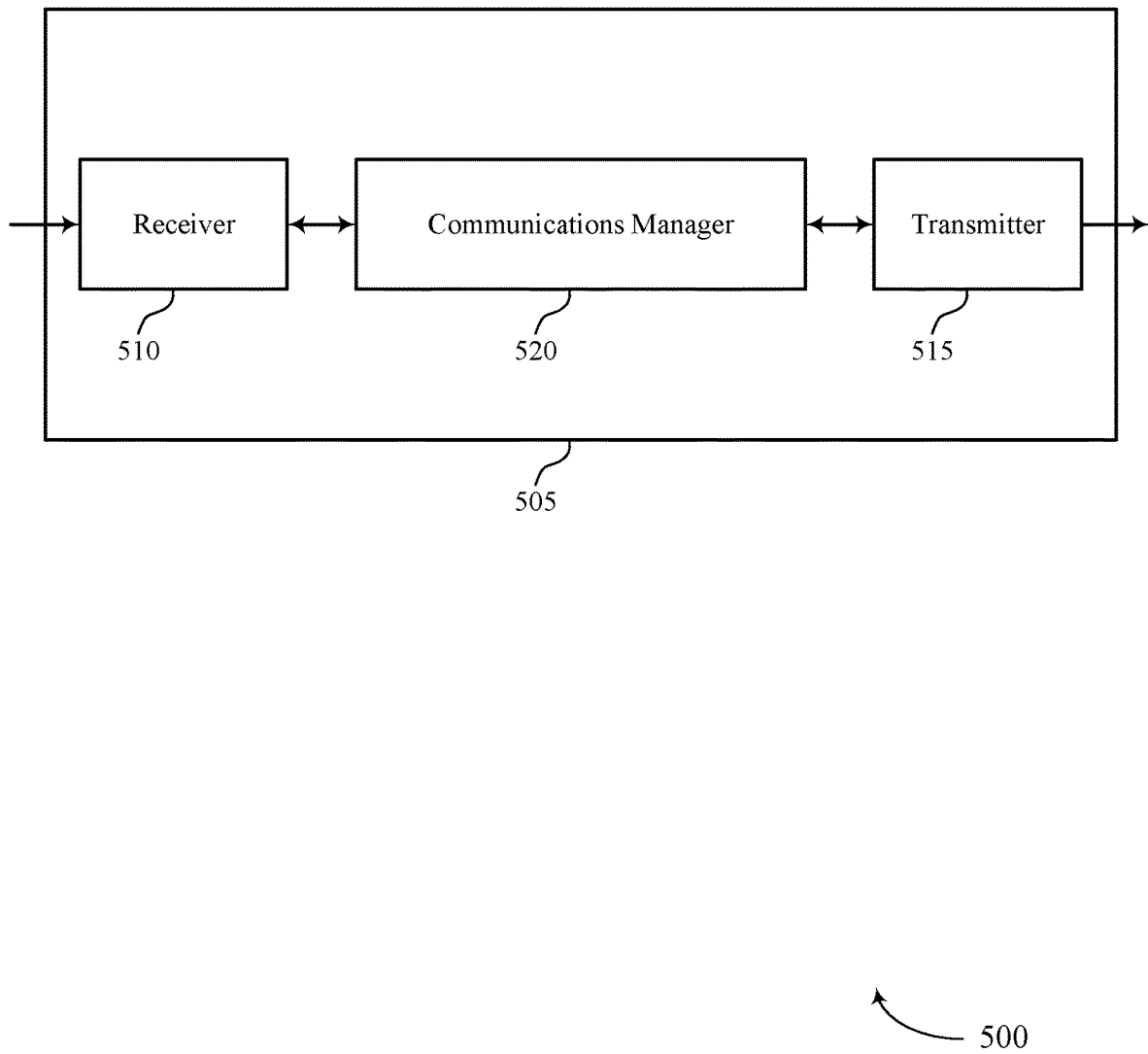
FIGS. 5 and 6 show block diagrams of devices that support network-supported power management for base stations in accordance with aspects of the present disclosure.

FIG. 5 shows a block diagram 500 of a device 505 that supports network-supported power management for base stations in accordance with aspects of the present disclosure. The device 505 may be an example of aspects of a base station 105 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to network-supported power management for base stations). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to network-supported power management for base stations). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of network-supported power management for base stations as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication in accordance with examples as disclosed herein. For example, the communications manager 520 may be configured as or otherwise support a means for determining, at a first base station of a set of multiple base stations, that a UE is located in a coverage area of one of the set of multiple base stations within a coverage pattern for the set of multiple base stations based on data from one or more sensors coupled with the first base station, a radio resource control state of the UE, or both, where the coverage pattern for the set of multiple base stations is based on an arrangement of a set of multiple coverage areas of the set of multiple base stations. The communications manager 520 may be configured as or otherwise support a means for estimating, at the first base station, a trajectory of the UE based on the one or more sensors. The communications manager 520 may be configured as or otherwise support a means for transmitting, from the first base station to a second base station of the set of multiple base stations via a backhaul interface, an indication to enter an active state and of one or more beams to enable after entering the first operating state (e.g., an active state) based on the trajectory of the UE and the coverage pattern.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reducing a power consumption of a radio network by supporting power management operation at one or more base stations.

Figure 6:
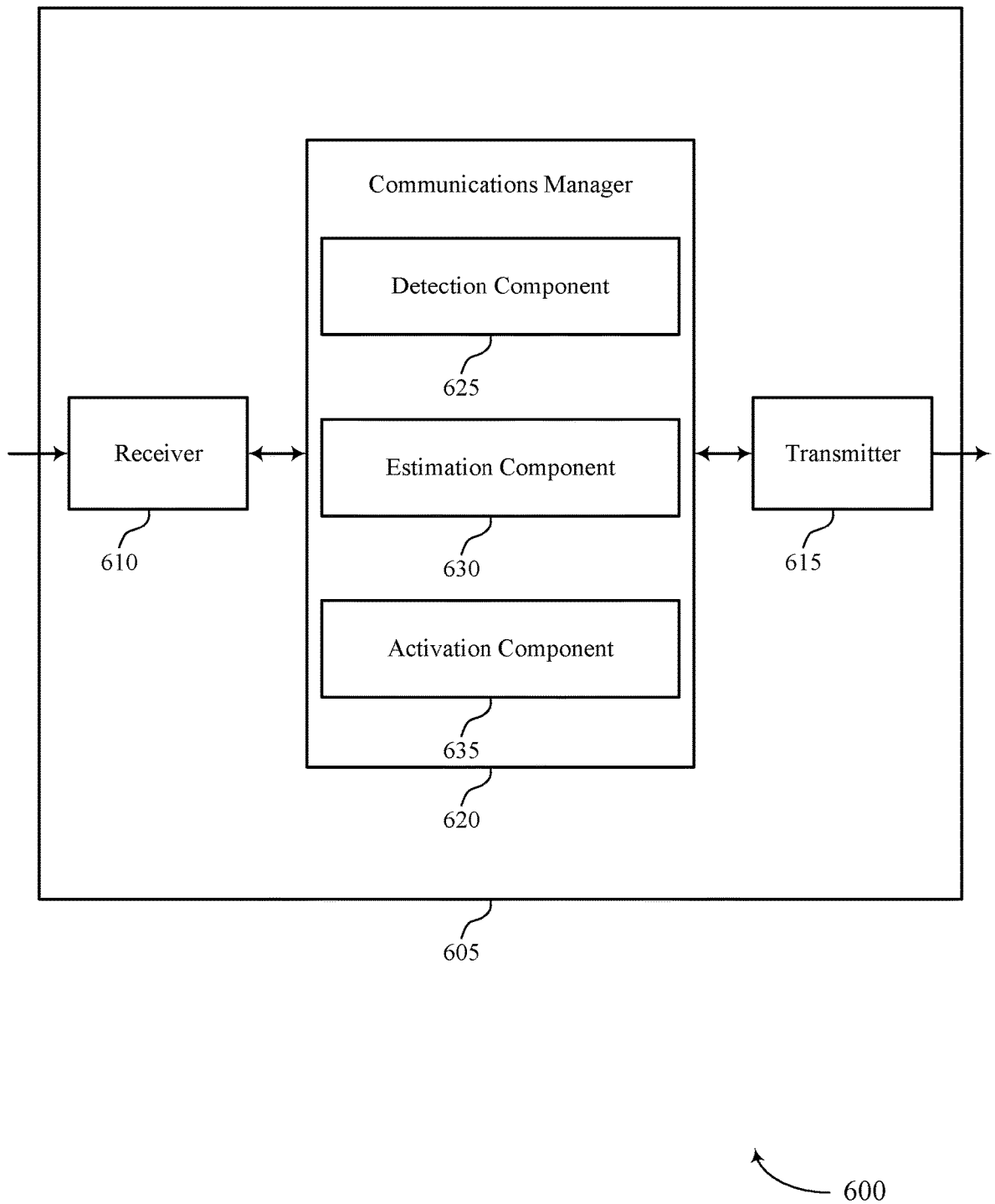

FIG. 6 shows a block diagram 600 of a device 605 that supports network-supported power management for base stations in accordance with aspects of the present disclosure. The device 605 may be an example of aspects of a device 505 or a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to network-supported power management for base stations). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to network-supported power management for base stations). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of network-supported power management for base stations as described herein. For example, the communications manager 620 may include a detection component 625, an estimation component 630, an activation component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication in accordance with examples as disclosed herein. The detection component 625 may be configured as or otherwise support a means for determining, at a first base station of a set of multiple base stations, that a UE is located in a coverage area of one of the set of multiple base stations within a coverage pattern for the set of multiple base stations based on data from one or more sensors coupled with the first base station, a radio resource control state of the UE, or both, where the coverage pattern for the set of multiple base stations is based on an arrangement of a set of multiple coverage areas of the set of multiple base stations. The estimation component 630 may be configured as or otherwise support a means for estimating, at the first base station, a trajectory of the UE based on the one or more sensors. The activation component 635 may be configured as or otherwise support a means for transmitting, from the first base station to a second base station of the set of multiple base stations via a backhaul interface, an indication to enter an active state and of one or more beams to enable after entering the first operating state (e.g., an active state) based on the trajectory of the UE and the coverage pattern.

Figure 7:
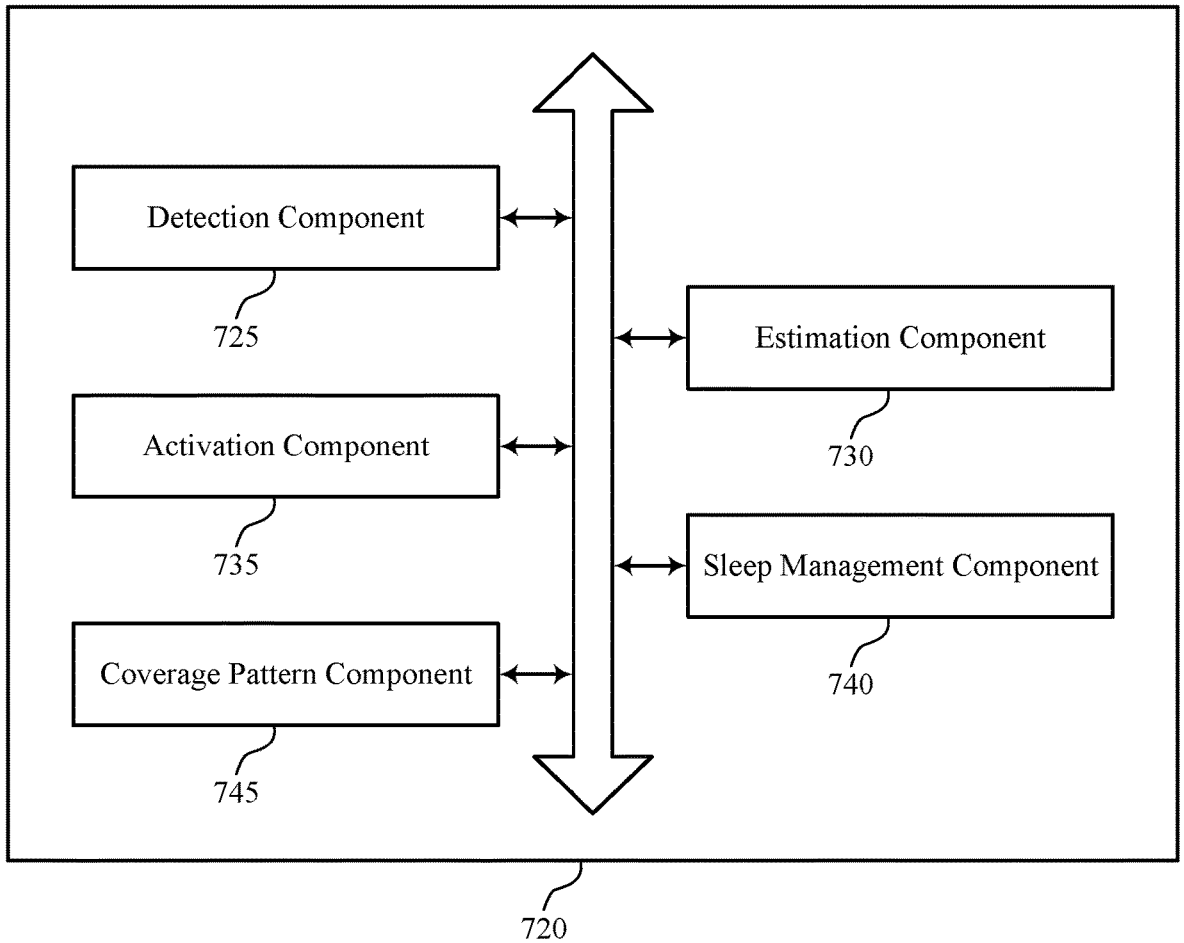
FIG. 7 shows a block diagram of a communications manager that supports network-supported power management for base stations in accordance with aspects of the present disclosure.

FIG. 7 shows a block diagram 700 of a communications manager 720 that supports network-supported power management for base stations in accordance with aspects of the present disclosure. The communications manager 720 may be an example of aspects of a communications manager 520, a communications manager 620, or both, as described herein. The communications manager 720, or various components thereof, may be an example of means for performing various aspects of network-supported power management for base stations as described herein. For example, the communications manager 720 may include a detection component 725, an estimation component 730, an activation component 735, a sleep management component 740, a coverage pattern component 745, or any combination thereof. Each of these components may communicate, directly or indirectly, with one another (e.g., via one or more buses).

The communications manager 720 may support wireless communication in accordance with examples as disclosed herein. The detection component 725 may be configured as or otherwise support a means for determining, at a first base station of a set of multiple base stations, that a UE is located in a coverage area of one of the set of multiple base stations within a coverage pattern for the set of multiple base stations based on data from one or more sensors coupled with the first base station, a radio resource control state of the UE, or both, where the coverage pattern for the set of multiple base stations is based on an arrangement of a set of multiple coverage areas of the set of multiple base stations. The estimation component 730 may be configured as or otherwise support a means for estimating, at the first base station, a trajectory of the UE based on the one or more sensors. The activation component 735 may be configured as or otherwise support a means for transmitting, from the first base station to a second base station of the set of multiple base stations via a backhaul interface, an indication to enter an active state and of one or more beams to enable after entering the first operating state (e.g., an active state) based on the trajectory of the UE and the coverage pattern.

In some examples, to support estimating a trajectory of the UE, the estimation component 730 may be configured as or otherwise support a means for predicting a transition of the UE from the coverage area of the first base station into a coverage area of the second base station.

In some examples, the activation component 735 may be configured as or otherwise support a means for receiving, at the first base station from the second base station via the backhaul interface, a second indication that the second base station has entered the first operating state based on transmitting the indication.

In some examples, the sleep management component 740 may be configured as or otherwise support a means for transmitting, from the first base station to the second base station via the backhaul interface, a query about an operating state of the second base station. In some examples, the sleep management component 740 may be configured as or otherwise support a means for receiving, at the first base station from the second base station, a response to the query indicating the operating state of the second base station.

In some examples, the sleep management component 740 may be configured as or otherwise support a means for transmitting, from the first base station to the second base station via the backhaul interface, a second indication of a quantity of UEs within a second coverage area of the second base station, the quantity of UEs being determined by the first base station based on the one or more sensors.

In some examples, the sleep management component 740 may be configured as or otherwise support a means for transmitting, from the first base station to a third base station via the backhaul interface, a second indication to enter a second operating state based on the trajectory of the UE and the coverage pattern, where the first operating state is an active state and the second operating state is an inactive state.

In some examples, the sleep management component 740 may be configured as or otherwise support a means for receiving, at the first base station from a third base station via the backhaul interface, a query about enabling an operating state of the third base station. In some examples, the sleep management component 740 may be configured as or otherwise support a means for transmitting, based on the query, a response to the third base station, the response including a second indication to enter a second operating state based on the trajectory of the UE and the coverage pattern.

In some examples, the sleep management component 740 may be configured as or otherwise support a means for transmitting, from the first base station to one or more of the set of multiple base stations via the backhaul interface, a second indication that the first base station has entered a second operating state.

In some examples, the estimation component 730 may be configured as or otherwise support a means for determining mobility information for the UE based on the data from one or more sensors, the mobility information including a velocity of the UE, a direction in which the UE is travelling, or both, where estimating the trajectory of the UE is based on the mobility information.

In some examples, the estimation component 730 may be configured as or otherwise support a means for determining transmission information for the UE including a direction of arrival for transmissions, a time of arrival for transmissions, one or more beams selected by the UE, or any combination thereof, where estimating the trajectory of the UE is based on the transmission information.

In some examples, the estimation component 730 may be configured as or otherwise support a means for determining the radio resource control state of the UE, where estimating the trajectory of the UE is based on the radio resource control state.

In some examples, to support estimating the trajectory of the UE, the estimation component 730 may be configured as or otherwise support a means for estimating the trajectory of the UE based on temporal mobility-based traffic patterns of UEs within the coverage pattern, geographical information associated with travelling across the coverage pattern, or any combination thereof.

In some examples, the coverage pattern component 745 may be configured as or otherwise support a means for determining, at the first base station, the coverage pattern for the set of multiple base stations.

In some examples, to support determining the coverage pattern for the set of multiple base stations, the coverage pattern component 745 may be configured as or otherwise support a means for receiving the coverage pattern from a network entity that is coupled with the set of multiple base stations.

In some examples, to support determining the coverage pattern for the set of multiple base stations, the coverage pattern component 745 may be configured as or otherwise support a means for determining a set of multiple coverage areas for a set of multiple cells supported by the set of multiple base stations. In some examples, to support determining the coverage pattern for the set of multiple base stations, the coverage pattern component 745 may be configured as or otherwise support a means for combining the set of multiple coverage areas to obtain the coverage pattern based on the determining.

In some examples, to support determining the set of multiple coverage areas, the coverage pattern component 745 may be configured as or otherwise support a means for determining, for each base station of the set of multiple base stations, coverage areas of one or more cells supported by a respective base station based on one or more blockages affecting the coverage area of the respective base station.

In some examples, to support determining the set of multiple coverage areas, the coverage pattern component 745 may be configured as or otherwise support a means for using a machine learning algorithm to estimate a temporal variation of the set of multiple coverage areas based on current blockages, recurring blockages, a time of day, reported channel state information, or any combination thereof.

In some examples, the data from the one or more sensors used to determine that the UE is located within the coverage area of the first base station includes visual data, location data, coverage data, light based ranging data, radio based ranging data, global positioning data, signal reception data, or any combination thereof. Light-based ranging data may include techniques for determining a distance of an object based on a reflection of transmitted light beams. An example of light-based ranging data may include lidar. Radio-based ranging data may include techniques for determining a distance of an object based on a reflection of transmitted radio beams. An example of radio-based ranging data may include radar.

In some examples, the one or more sensors include a camera, a radar detector, a lidar detector, a global positioning system component, a signal reception component, or any combination thereof.

Figure 8:
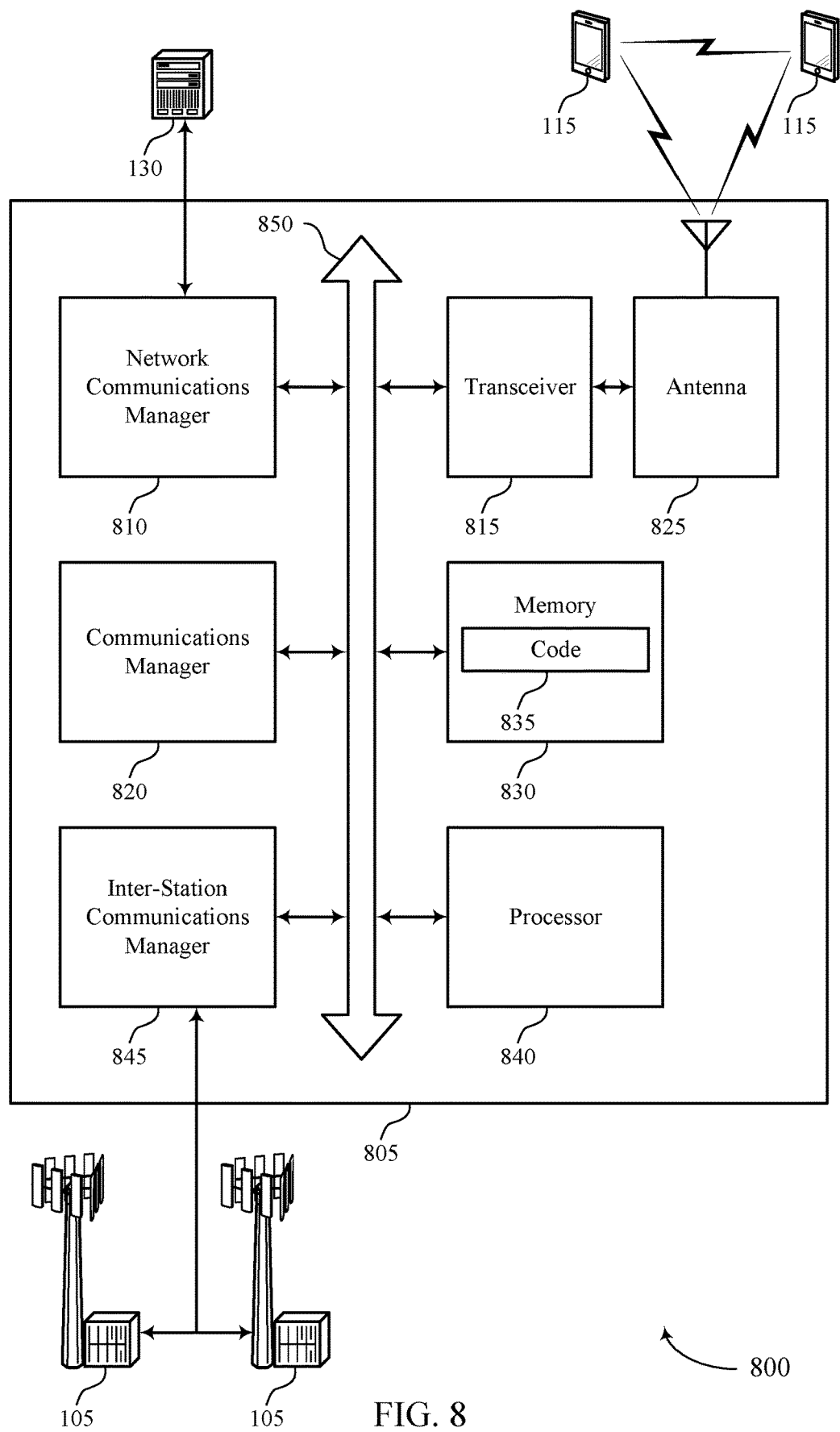
FIG. 8 shows a diagram of a system including a device that supports network-supported power management for base stations in accordance with aspects of the present disclosure.

FIG. 8 shows a diagram of a system 800 including a device 805 that supports network-supported power management for base stations in accordance with aspects of the present disclosure. The device 805 may be an example of or include the components of a device 505, a device 605, or a base station 105 as described herein. The device 805 may communicate wirelessly with one or more base stations 105, UEs 115, or any combination thereof. The device 805 may include components for bi-directional voice and data communications including components for transmitting and receiving communications, such as a communications manager 820, a network communications manager 810, a transceiver 815, an antenna 825, a memory 830, code 835, a processor 840, and an inter-station communications manager 845. These components may be in electronic communication or otherwise coupled (e.g., operatively, communicatively, functionally, electronically, electrically) via one or more buses (e.g., a bus 850).

The network communications manager 810 may manage communications with a core network 130 (e.g., via one or more wired backhaul links). For example, the network communications manager 810 may manage the transfer of data communications for client devices, such as one or more UEs 115.

In some cases, the device 805 may include a single antenna 825. However, in some other cases the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random-access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed)

to perform functions described herein. In some cases, the memory 830 may contain, among other things, a basic input/output system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting network-supported power management for base stations). For example, the device 805 or a component of the device 805 may include a processor 840 and memory 830 coupled to the processor 840, the processor 840 and memory 830 configured to perform various functions described herein.

The inter-station communications manager 845 may manage communications with other base stations 105, and may include a controller or scheduler for controlling communications with UEs 115 in cooperation with other base stations 105. For example, the inter-station communications manager 845 may coordinate scheduling for transmissions to UEs 115 for various interference mitigation techniques such as beamforming or joint transmission. In some examples, the inter-station communications manager 845 may provide an X2 interface within an LTE/LTE-A wireless communications network technology to provide communication between base stations 105.

The communications manager 820 may support wireless communication in accordance with examples as disclosed herein. For example, the communications manager 820 may be configured as or otherwise support a means for determining, at a first base station of a set of multiple base stations, that a UE is located in a coverage area of one of the set of multiple base stations within a coverage pattern for the set of multiple base stations based on data from one or more sensors coupled with the first base station, a radio resource control state of the UE, or both, where the coverage pattern for the set of multiple base stations is based on an arrangement of a set of multiple coverage areas of the set of multiple base stations. The communications manager 820 may be configured as or otherwise support a means for estimating, at the first base station, a trajectory of the UE based on the one or more sensors. The communications manager 820 may be configured as or otherwise support a means for transmitting, from the first base station to a second base station of the set of multiple base stations via a backhaul interface, an indication to enter an active state and of one or more beams to enable after entering the first operating state (e.g., an active state) based on the trajectory of the UE and the coverage pattern.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of network-supported power management for base stations as described herein, or the processor 840 and the memory 830 may be otherwise configured to perform or support such operations.

Figure 9:
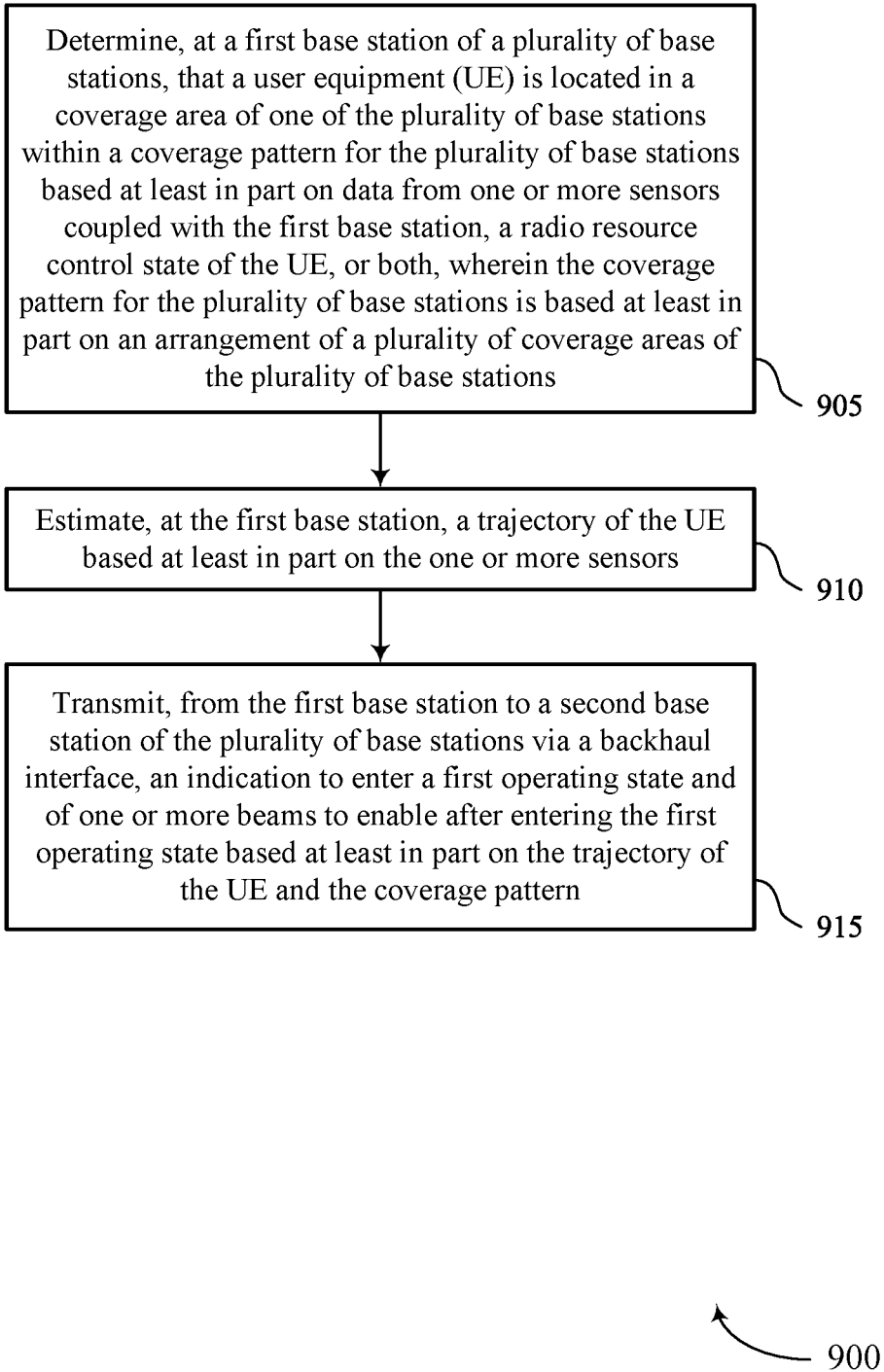
FIG. 9 shows a flowchart illustrating methods that support network-supported power management for base stations in accordance with aspects of the present disclosure.

FIG. 9 shows a flowchart illustrating a method 900 that supports network-supported power management for base stations in accordance with aspects of the present disclosure. The operations of the method 900 may be implemented by a base station or its components as described herein. For example, the operations of the method 900 may be performed by a base station 105 as described with reference to FIGS. 1 through 8. In some examples, a base station may execute a set of instructions to control the functional elements of the base station to perform the described functions. Additionally, or alternatively, the base station may perform aspects of the described functions using special-purpose hardware.

At 905, the method may include determining, at a first base station of a set of multiple base stations, that a UE is located in a coverage area of one of the set of multiple base stations within a coverage pattern for the set of multiple base stations based on data from one or more sensors coupled with the first base station, a radio resource control state of the UE, or both, where the coverage pattern for the set of multiple base stations is based on an arrangement of a set of multiple coverage areas of the set of multiple base stations. The operations of 905 may be performed in accordance with examples as disclosed herein. In some examples, aspects of the operations of 905 may be performed by a detection component 725 as described with reference to FIG. 7.

At 910, the method may include estimating, at the first base station, a trajectory of the UE based on the one or more sensors. The operations of 910 may be performed in accordance with examples as disclosed herein. In some examples, aspects of the operations of 910 may be performed by an estimation component 730 as described with reference to FIG. 7.

At 915, the method may include transmitting, from the first base station to a second base station of the set of multiple base stations via a backhaul interface, an indication to enter an active state and of one or more beams to enable after entering the first operating state (e.g., an active state) based on the trajectory of the UE and the coverage pattern. The operations of 915 may be performed in accordance with examples as disclosed herein. In some examples, aspects of the operations of 915 may be performed by an activation component 735 as described with reference to FIG. 7.

The following provides an overview of aspects of the present disclosure:

Aspect 1: A method for wireless communication, comprising: determining, at a first base station of a plurality of base stations, that a UE is located in a coverage area of one of the plurality of base stations within a coverage pattern for the plurality of base stations based at least in part on data from one or more sensors coupled with the first base station, a radio resource control state of the UE, or both, wherein the coverage pattern for the plurality of base stations is based at least in part on an arrangement of a plurality of coverage areas of the plurality of base stations; estimating, at the first base station, a trajectory of the UE based at least in part on the one or more sensors; and transmitting, from the first base station to a second base station of the plurality of base stations via a backhaul interface, an indication to enter a first operating state and of one or more beams to enable after entering the first operating state based at least in part on the trajectory of the UE and the coverage pattern.

Aspect 2: The method of aspect 1, wherein estimating a trajectory of the UE comprises: predicting a transition of the UE from the coverage area of the first base station into a coverage area of the second base station.

Aspect 3: The method of any of aspects 1 through 2, further comprising: receiving, at the first base station from the second base station via the backhaul interface, a second indication that the second base station has entered the first operating state based at least in part on transmitting the indication.

Aspect 4: The method of any of aspects 1 through 3, further comprising: transmitting, from the first base station to the second base station via the backhaul interface, a query about an operating state of the second base station; and receiving, at the first base station from the second base station, a response to the query indicating the operating state of the second base station.

Aspect 5: The method of any of aspects 1 through 4, further comprising: transmitting, from the first base station to the second base station via the backhaul interface, a second indication of a quantity of UEs within a second coverage area of the second base station, the quantity of UEs being determined by the first base station based at least in part on the one or more sensors.

Aspect 6: The method of any of aspects 1 through 5, further comprising: transmitting, from the first base station to a third base station via the backhaul interface, a second indication to enter a second operating state based at least in part on the trajectory of the UE and the coverage pattern, wherein the first operating state is an active state and the second operating state is an inactive state.

Aspect 7: The method of any of aspects 1 through 6, further comprising: receiving, at the first base station from a third base station via the backhaul interface, a query about enabling an operating state of the third base station; and transmitting, based at least in part on the query, a response to the third base station, the response comprising a second indication to enter a second operating state based at least in part on the trajectory of the UE and the coverage pattern.

Aspect 8: The method of any of aspects 1 through 7, further comprising: transmitting, from the first base station to one or more of the plurality of base stations via the backhaul interface, a second indication that the first base station has entered a second operating state.

Aspect 9: The method of any of aspects 1 through 8, further comprising: determining mobility information for the UE based at least in part on the data from one or more sensors, the mobility information comprising a velocity of the UE, a direction in which the UE is travelling, or both, wherein estimating the trajectory of the UE is based at least in part on the mobility information.

Aspect 10: The method of any of aspects 1 through 9, further comprising: determining transmission information for the UE comprising a direction of arrival for transmissions, a time of arrival for transmissions, one or more beams selected by the UE, or any combination thereof, wherein estimating the trajectory of the UE is based at least in part on the transmission information.

Aspect 11: The method of any of aspects 1 through 10, further comprising: determining the radio resource control state of the UE, wherein estimating the trajectory of the UE is based at least in part on the radio resource control state.

Aspect 12: The method of any of aspects 1 through 11, wherein estimating the trajectory of the UE further comprises: estimating the trajectory of the UE based at least in part on temporal mobility based traffic patterns of UEs within the coverage pattern, geographical information associated with travelling across the coverage pattern, or any combination thereof.

Aspect 13: The method of any of aspects 1 through 12, further comprising: determining, at the first base station, the coverage pattern for the plurality of base stations.

Aspect 14: The method of aspect 13, wherein determining the coverage pattern for the plurality of base stations comprises: receiving the coverage pattern from a network entity that is coupled with the plurality of base stations.

Aspect 15: The method of any of aspects 13 through 14, wherein determining the coverage pattern for the plurality of base stations comprises: determining a plurality of coverage areas for a plurality of cells supported by the plurality of base stations; and combining the plurality of coverage areas to obtain the coverage pattern based at least in part on the determining.

Aspect 16: The method of aspect 15, wherein determining the plurality of coverage areas comprises: determining, for each base station of the plurality of base stations, coverage areas of one or more cells supported by a respective base station based at least in part on one or more blockages affecting the coverage area of the respective base station.

Aspect 17: The method of any of aspects 15 through 16, wherein determining the plurality of coverage areas comprises: using a machine learning algorithm to estimate a temporal variation of the plurality of coverage areas based at least in part on current blockages, recurring blockages, a time of day, reported channel state information, or any combination thereof.

Aspect 18: The method of any of aspects 1 through 17, wherein the data from the one or more sensors used to determine that the UE is located within the coverage area of the first base station comprises visual data, location data, coverage data, light based ranging data, radio based ranging data, global positioning data, signal reception data, or any combination thereof.

Aspect 19: The method of any of aspects 1 through 18, wherein the one or more sensors comprise a camera, a radar detector, a lidar detector, a global positioning system component, a signal reception component, or any combination thereof.

Aspect 20: An apparatus for wireless communication, comprising a processor; memory coupled with the processor; and instructions stored in the memory and executable by the processor to cause the apparatus to perform a method of any of aspects 1 through 19.

Aspect 21: An apparatus for wireless communication, comprising at least one means for performing a method of any of aspects 1 through 19.

Aspect 22: A non-transitory computer-readable medium storing code for wireless communication, the code comprising instructions executable by a processor to perform a method of any of aspects 1 through 19.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication, comprising:
   determining, at a first base station of a plurality of base stations, that a user equipment (UE) is located in a coverage area of one of the plurality of base stations within a coverage pattern for the plurality of base stations based at least in part on data from one or more sensors coupled with the first base station, a radio resource control state of the UE, or both, wherein the coverage pattern for the plurality of base stations is based at least in part on an arrangement of a plurality of coverage areas of the plurality of base stations;
   estimating, at the first base station, a trajectory of the UE based at least in part on the one or more sensors; and
   transmitting, from the first base station to a second base station of the plurality of base stations via a backhaul interface, signaling that indicates for the second base station to transition from an inactive state to an active state and that indicates, from among a plurality of beams supported by the second base station, one or more beams of the plurality of beams for the second base station to enable after transitioning from the inactive state to the active state based at least in part on the trajectory of the UE and the coverage pattern.

2. The method of claim 1, wherein estimating the trajectory of the UE comprises:
predicting a transition of the UE from a first coverage area of the first base station into a second coverage area of the second base station.

3. The method of claim 1, further comprising:
receiving, at the first base station from the second base station via the backhaul interface, in response to the signaling that indicates for the second base station to transition from the inactive state to the active state, an indication that the second base station has transitioned from the inactive state to the active state.

4. The method of claim 1, further comprising:
transmitting, from the first base station to the second base station via the backhaul interface, a query about an operating state of the second base station; and
receiving, at the first base station from the second base station, a response to the query indicating the operating state of the second base station.

5. The method of claim 1, further comprising:
transmitting, from the first base station to the second base station via the backhaul interface, an indication of a quantity of UEs within a second coverage area of the second base station, the quantity of UEs being determined by the first base station based at least in part on the one or more sensors.

6. The method of claim 1, further comprising:
transmitting, from the first base station to a third base station via the backhaul interface, an indication to enter the inactive state based at least in part on the trajectory of the UE and the coverage pattern.

7. The method of claim 1, further comprising:
receiving, at the first base station from a third base station via the backhaul interface, a query about enabling an operating state of the third base station; and
transmitting, based at least in part on the query, a response to the third base station, the response comprising an indication to enter a second operating state based at least in part on the trajectory of the UE and the coverage pattern.

8. The method of claim 1, further comprising:
transmitting, from the first base station to one or more of the plurality of base stations via the backhaul interface, an indication that the first base station has entered a second operating state.

9. The method of claim 1, further comprising:
determining mobility information for the UE based at least in part on the data from the one or more sensors, the mobility information comprising a velocity of the UE, a direction in which the UE is travelling, or both, wherein estimating the trajectory of the UE is based at least in part on the mobility information.

10. The method of claim 1, further comprising:
determining transmission information for the UE comprising a direction of arrival for transmissions, a time of arrival for the transmissions, one or more second beams selected by the UE, or any combination thereof, wherein estimating the trajectory of the UE is based at least in part on the transmission information.

11. The method of claim 1, further comprising:
determining the radio resource control state of the UE, wherein estimating the trajectory of the UE is based at least in part on the radio resource control state.

12. The method of claim 1, wherein estimating the trajectory of the UE further comprises:
estimating the trajectory of the UE based at least in part on temporal mobility based traffic patterns of UEs within the coverage pattern, geographical information associated with travelling across the coverage pattern, or any combination thereof.

13. The method of claim 1, further comprising:
determining, at the first base station, the coverage pattern for the plurality of base stations.

14. The method of claim 13, wherein determining the coverage pattern for the plurality of base stations comprises:
receiving the coverage pattern from a network entity that is coupled with the plurality of base stations.

15. The method of claim 13, wherein determining the coverage pattern for the plurality of base stations comprises:
determining a plurality of second coverage areas for a plurality of cells supported by the plurality of base stations; and
combining the plurality of second coverage areas to obtain the coverage pattern based at least in part on the determining.

16. The method of claim 15, wherein determining the plurality of second coverage areas comprises:
determining, for each base station of the plurality of base stations, coverage areas of one or more cells supported by a respective base station based at least in part on one or more blockages affecting respective coverage areas of the respective base station.

17. The method of claim 15, wherein determining the plurality of second coverage areas comprises:
using a machine learning algorithm to estimate a temporal variation of the plurality of second coverage areas based at least in part on current blockages, recurring blockages, a time of day, reported channel state information, or any combination thereof.

18. The method of claim 1, wherein the data from the one or more sensors used to determine that the UE is located within the coverage area of the first base station comprises visual data, location data, coverage data, light-based ranging data, radio-based ranging data, global positioning data, signal reception data, or any combination thereof.

19. The method of claim 1, wherein the one or more sensors comprise a camera, a radar detector, a lidar detector, a global positioning system component, a signal reception component, or any combination thereof.

20. An apparatus for wireless communication, comprising:
one or more processors;
one or more memories coupled with the one or more processors; and
instructions stored in the one or more memories and executable by the one or more processors to cause the apparatus to:
determine, at a first base station of a plurality of base stations, that a user equipment (UE) is located in a coverage area of one of the plurality of base stations within a coverage pattern for the plurality of base stations based at least in part on data from one or more sensors coupled with the first base station, a radio resource control state of the UE, or both, wherein the coverage pattern for the plurality of base stations is based at least in part on an arrangement of a plurality of coverage areas of the plurality of base stations;
estimate, at the first base station, a trajectory of the UE based at least in part on the one or more sensors; and transmit, from the first base station to a second base station of the plurality of base stations via a backhaul interface, signaling that indicates for the second base station to transition from an inactive state to an active state and that indicates, from among a plurality of beams supported by the second base station, one or more beams of the plurality of beams for the second base station to enable after transitioning from the inactive state to the active state based at least in part on the trajectory of the UE and the coverage pattern.

21. The apparatus of claim 20, wherein the instructions are further executable by the one or more processors to cause the apparatus to:
receive, at the first base station from the second base station via the backhaul interface, in response to the signaling that indicates for the second base station to transition from the inactive state to the active state, an indication that the second base station has transitioned from the inactive state to the active state.

22. The apparatus of claim 20, wherein the instructions are further executable by the one or more processors to cause the apparatus to:
transmit, from the first base station to the second base station via the backhaul interface, a query about an operating state of the second base station; and
receive, at the first base station from the second base station, a response to the query indicating the operating state of the second base station.

23. The apparatus of claim 20, wherein the instructions are further executable by the one or more processors to cause the apparatus to:
transmit, from the first base station to the second base station via the backhaul interface, an indication of a quantity of UEs within a second coverage area of the second base station, the quantity of UEs being determined by the first base station based at least in part on the one or more sensors.

24. The apparatus of claim 20, wherein the instructions are further executable by the one or more processors to cause the apparatus to:
transmit, from the first base station to a third base station via the backhaul interface, an indication to enter the inactive state based at least in part on the trajectory of the UE and the coverage pattern.

25. The apparatus of claim 20, wherein the instructions are further executable by the one or more processors to cause the apparatus to:
receive, at the first base station from a third base station via the backhaul interface, a query about enabling an operating state of the third base station; and
transmit, based at least in part on the query, a response to the third base station, the response comprising an indication to enter a second operating state based at least in part on the trajectory of the UE and the coverage pattern.

26. The apparatus of claim 20, wherein the instructions are further executable by the one or more processors to cause the apparatus to:
transmit, from the first base station to one or more of the plurality of base stations via the backhaul interface, an indication that the first base station has entered a second operating state.

27. The apparatus of claim 20, wherein the instructions are further executable by the one or more processors to cause the apparatus to:
determine mobility information for the UE based at least in part on the data from the one or more sensors, the mobility information comprising a velocity of the UE, a direction in which the UE is travelling, or both, wherein estimating the trajectory of the UE is based at least in part on the mobility information.

28. An apparatus for wireless communication, comprising:
means for determining, at a first base station of a plurality of base stations, that a user equipment (UE) is located in a coverage area of one of the plurality of base stations within a coverage pattern for the plurality of base stations based at least in part on data from one or more sensors coupled with the first base station, a radio resource control state of the UE, or both, wherein the coverage pattern for the plurality of base stations is based at least in part on an arrangement of a plurality of coverage areas of the plurality of base stations;
means for estimating, at the first base station, a trajectory of the UE based at least in part on the one or more sensors; and
means for transmitting, from the first base station to a second base station of the plurality of base stations via a backhaul interface, signaling that indicates for the second base station to transition from an inactive state to an active state and that indicates, from among a plurality of beams supported by the second base station, one or more beams of the plurality of beams for the second base station to enable after transitioning from the inactive state to the active state based at least in part on the trajectory of the UE and the coverage pattern.

29. The apparatus of claim 28, further comprising:
means for receiving, at the first base station from the second base station via the backhaul interface, in response to the signaling that indicates for the second base station to transition from the inactive state to the active state, an indication that the second base station has transitioned from the inactive state to the active state.

30. One or more non-transitory, computer-readable media storing code for wireless communication, the code comprising instructions executable by one or more processors to:
determine, at a first base station of a plurality of base stations, that a user equipment (UE) is located in a coverage area of one of the plurality of base stations within a coverage pattern for the plurality of base stations based at least in part on data from one or more sensors coupled with the first base station, a radio resource control state of the UE, or both, wherein the coverage pattern for the plurality of base stations is based at least in part on an arrangement of a plurality of coverage areas of the plurality of base stations;
estimate, at the first base station, a trajectory of the UE based at least in part on the one or more sensors; and
transmit, from the first base station to a second base station of the plurality of base stations via a backhaul interface, signaling that indicates for the second base station to transition from an inactive state to an active state and that indicates, from among a plurality of beams supported by the second base station, one or more beams of the plurality of beams for the second base station to enable after transitioning from the inactive state to the active state based at least in part on the trajectory of the UE and the coverage pattern.

* * * * *